US012754554B2

(12) United States Patent
Kron

(10) Patent No.: US 12,754,554 B2
(45) Date of Patent: Oct. 6, 2026

(54) AIRCRAFT CONTROL SYSTEMS AND METHODS USING SLIDING MODE CONTROL AND FEEDBACK LINEARIZATION

(71) Applicant: BOMBARDIER INC., Dorval (CA)

(72) Inventor: Aymeric Kron, Beaconsfield (CA)

(73) Assignee: BOMBARDIER INC., Dorval (CA)

( * ) Notice: Subject to any disclaimer, the term of this patent is extended or adjusted under 35 U.S.C. 154(b) by 0 days.

(21) Appl. No.: 19/267,512

(22) Filed: Jul. 12, 2025

(65) Prior Publication Data

US 2025/0341839 A1 Nov. 6, 2025

Related U.S. Application Data

(63) Continuation of application No. 18/660,437, filed on May 10, 2024, now Pat. No. 12,386,362, which is a continuation of application No. 17/038,441, filed on Sep. 30, 2020, now Pat. No. 12,019,456.

(60) Provisional application No. 62/907,839, filed on Sep. 30, 2019.

(51) Int. Cl.

| | |
|---|---|
| ***G05D 1/00*** | (2024.01) |
| ***G05D 1/46*** | (2024.01) |
| ***G05D 1/48*** | (2024.01) |
| ***G05D 1/49*** | (2024.01) |
| ***G05D 3/12*** | (2006.01) |
| ***G06F 17/11*** | (2006.01) |

(52) U.S. Cl.

CPC ............ *G05D 1/044* (2013.01); *G05D 1/085* (2013.01); *G05D 1/46* (2024.01); *G05D 1/48* (2024.01); *G05D 1/49* (2024.01); *G05D 3/12* (2013.01); *G06F 17/11* (2013.01)

(58) Field of Classification Search

CPC ........... G05D 1/044; G05D 1/48; G05D 1/49; G05D 1/46; G05D 1/085; G05D 1/0825; G05D 3/12; G06F 17/11

See application file for complete search history.

(56) References Cited

U.S. PATENT DOCUMENTS

| | | | |
|---|---|---|---|
| 5,050,086 | A | 9/1991 | Lambregts |
| 6,330,483 | B1 | 12/2001 | Dailey |
| 6,539,290 | B1 | 3/2003 | Vos |
| 6,859,689 | B2 | 2/2005 | Vos |

(Continued)

FOREIGN PATENT DOCUMENTS

| | | |
|---|---|---|
| EP | 1901153 A1 | 3/2008 |

OTHER PUBLICATIONS

Hakim Bouadi et al., Flight path tracking based-on direct adaptive sliding mode control, IEEE Intelligent Vehicles Symposium (IV) Jun. 5-9, 2011, Germany.

(Continued)

*Primary Examiner* — Rodney A Bonnette

(74) *Attorney, Agent, or Firm* — Norton Rose Fulbright Canada LLP

(57) ABSTRACT

Methods and systems for controlling a bank angle, a heading angle and an altitude of an aircraft during flight are provided. The methods and systems disclosed herein make use of sliding mode control and feedback linearization control (nonlinear dynamic control) techniques. The methods and systems can provide autopilot-type functions that can autonomously execute aggressive maneuvers as well as more gentle maneuvers for aircraft.

24 Claims, 21 Drawing Sheets

(56) References Cited

U.S. PATENT DOCUMENTS

| | | | |
|---|---|---|---|
| 8,131,408 | B2 | 3/2012 | Kordt |
| 2010/0185345 | A1 | 7/2010 | Chiesa |

OTHER PUBLICATIONS

Shashiprakash Singh et al., Automatic Path Planning and Control Design for Autonomous Landing of UAVs using Dynamic Inversion, 2009 American Control Conference, Jun. 10-12, 2009, USA.
Christopher J. Miller, Nonlinear Dynamic Inversion Baseline Control Law: Architecture and Performance Predictions, AIAA Guidance, Navigation, and Control Conference, Aug. 8-11, 2011, USA.
Steve Ulrich et al., Attitude Guidance and Control for Synchronized Maneuvers About a Fixed Rotation Axis, AIAA Guidance, Navigation and Control Conference and Exhibit, Jun. 15, 2012, USA.
Ying-Chih Lai et al., Design and Implementation of an Optimal Energy Control System for Fixed-Wing Unmanned Aerial Vehicles, App. Sci. Nov. 19, 2016; https://doi.org/10.3390/app6110369.
Kevin R. Bruce, NASA B737 Flight Test Results of the Total Energy Control System, NASA CR-178285, Jul. 1, 1987, https://ntrs.nasa.gov/citations/19870017485, p. 1, USA.
Matthew E. Argyle et al., Nonlinear Total Energy Control for the Longitudinal Dynamics of an Aircraft, 2016 American Control Conference (ACC), Jul. 6-8, 2016, USA.
Juan Merkt, Solving an Age-Old Debate: What Really Controls Altitude and Airspeed?, A3IRCON 2015, Jan. 16, 2015, USA.
M. Christopher Cotting et al., A Generic Guidance and Control Structure for Six-Degree of Freedom Conceptual Aircraft Design, 43rd AIAA Aerospace Sciences Meeting and Exhibit, Jan. 10-13, 2005, USA.
Abhay A. Pashilkar et al., Design of a Nonlinear Dynamic Inversion Controller for Trajectory Following and Maneuvering for Fixed Wing Aircraft, 2013 IEEE Symposium on Computational Intelligence for Security and Defense Applications (CISDA), Apr. 16-19, 2013, USA.
Inseok Yang et al., Designing a Robust Nonlinear Dynamic Inversion Controller for Spacecraft Formation Flying, Mathematical Problems in Engineering, vol. 2014, Article ID 471352, 12 pages, Jul. 17, 2014. https://doi.org/10.1155/2014/471352.
James Robert Fisher, Aircraft Control Using Nonlinear Dynamic Inversion in Conjunction with Adaptive Robust Control, Texas A&M University, Dec. 2004, pp. iii, 1, 21, 31, 36, 37, 53 and 59, USA.
Chao Zeng, Develop a Robust Nonlinear Controller for Large Aircraft by Applying Nonlinear Dynamic Inversion, Sliding Mode Control and Adaptive Control, Cranfield University School of Engineering, Dec. 2012, pp. i, 3 and 5, USA.

AIRCRAFT CONTROL SYSTEMS AND METHODS USING SLIDING MODE CONTROL AND FEEDBACK LINEARIZATION

CROSS-REFERENCE TO RELATED APPLICATIONS AND CLAIM OF PRIORITY

The present application is a continuation of U.S. patent application Ser. No. 18/660,437 filed on May 10, 2024 and incorporated herein by reference, which is a continuation of U.S. patent application Ser. No. 17/038,441 filed on Sep. 30, 2020 and incorporated herein by reference, which claims priority to U.S. Provisional Patent Application Ser. No. 62/907,839 filed on Sep. 30, 2019 and incorporated herein by reference.

TECHNICAL FIELD

The disclosure relates generally to aircraft, and more particularly to aircraft control systems and methods.

BACKGROUND

Existing aircraft control systems typically involve tunable parameters whose values must be scheduled according to the aircraft's orientation and flight conditions to achieve the desired performance across the entire operating envelope of the aircraft. This is typically a complex task which is both time-consuming and costly. Some control systems are based on the linearization of the aircraft's dynamics about a nominal operating point, and are therefore not tailored to the aircraft's nonlinear dynamics.

SUMMARY

In one aspect, the disclosure describes a method for controlling a bank angle (¢) of an aircraft during flight. The method comprises:

- receiving a commanded bank angle ($\phi_{cmd}$) for the aircraft;
- computing a bank angle error ($\phi_{err}$) indicative of a difference between the bank angle ($\phi$) of the aircraft and the commanded bank angle ($\phi_{cmd}$);
- computing a target rate of change ($\dot{\phi}_{des}$) for the bank angle ($\phi$) of the aircraft using a sliding mode control technique, an input to the sliding mode control technique including the bank angle error ($\phi_{err}$);
- computing a target body roll rate ($P_c$) for the aircraft using a feedback linearization (FL) control technique, an input to the FL control technique including the target rate of change ($\dot{\phi}_{des}$) for the bank angle ($\phi$) of the aircraft; and
- using the target body roll rate ($P_c$) to control one or more actuators of the aircraft during flight.

The FL control technique may include using an inversion of a relationship between the bank angle ($\phi$) of the aircraft and one or more body angular rates of the aircraft to calculate the target body roll rate ($P_c$) for the aircraft.

The FL control technique may include computing the target body roll rate ($P_c$) using the following formula: $P_c=\dot{\phi}_{des}-\tan\hat{\theta}\sin\hat{\phi}\hat{Q}-\tan\hat{\theta}\tan\hat{\phi}\hat{R}$, where $\hat{\theta}$ denotes a value indicative of a pitch angle of the aircraft, $\hat{\phi}$ denotes a value indicative of the bank angle ($\phi$) of the aircraft, $\hat{Q}$ denotes a value indicative of a body pitch rate of the aircraft, and $\hat{R}$ denotes a value indicative of a body yaw rate of the aircraft.

The sliding mode control technique may include generating the target rate of change ($\dot{\phi}_{des}$) of the bank angle ($\phi$) as a function of the bank angle error ($\phi_{err}$), a first threshold ($C_{\phi,1}$), a second threshold ($C_{\phi,2}$) and a third threshold ($C_{\phi,3}$) such that the target rate of change ($\dot{\phi}_{des}$) of the bank angle ($\phi$), when an absolute value of the bank angle error ($\phi_{err}$) is greater than the first threshold ($C_{\phi,1}$), is chosen to be substantially equal to a bank angle saturation rate ($\dot{\phi}_{lim}$).

When the absolute value of the bank angle error ($\phi_{err}$) is less than the first threshold ($C_{\phi,1}$) and greater than the second threshold ($C_{\phi,2}$), the target rate of change ($\dot{\phi}_{des}$) of the bank angle ($\phi$) may be computed using the following formula.

$$\dot{\phi}_{des}=\text{sign}(\phi_{err})\sqrt{2k_{\phi}^{2}C_{\phi,2}\left(|\phi_{err}|-\frac{C_{\phi,2}}{2}\right)},$$

where sign($\phi_{err}$) is a signum function of the bank angle error ($\phi_{err}$) and $k_{\phi}$ denotes a parameter.

When the absolute value of the bank angle error ($\phi_{err}$) is less than the third threshold ($C_{\phi,3}$), the target rate of change ($\dot{\phi}_{des}$) of the bank angle ($\phi$) may be chosen to be based on a proportional-integral-derivative control function of the bank angle error ($\phi_{err}$).

When the absolute value of the bank angle error ($\phi_{err}$) is less than the second threshold ($C_{\phi,2}$) and greater than the third threshold ($C_{\phi,3}$), the target rate of change ($\dot{\phi}_{des}$) of the bank angle ($\phi$) may be chosen to be proportional to the bank angle error ($\phi_{err}$).

When the absolute value of the bank angle error ($\phi_{err}$) is less than the second threshold ($C_{\phi,2}$) and greater than the third threshold ($C_{\phi,3}$), the target rate of change ($\dot{\phi}_{des}$) of the bank angle ($\phi$) may be computed using the following formula: $\dot{\phi}_{des}=k_{\phi}\phi_{err}$, where $k_{\phi}$ denotes a or the parameter.

The sliding mode control technique may include using a sigmoid function as a mapping between the target rate of change ($\dot{\phi}_{des}$) of the bank angle ($\phi$) and the bank angle error ($\phi_{err}$).

The aircraft may be a blended wing body aircraft.

Embodiments may include combinations of the above features.

In another aspect, the disclosure describes a computer program product for implementing a bank angle control function of an aircraft during flight, the computer program product comprising a non-transitory machine-readable storage medium having program code embodied therewith, the program code readable/executable by a computer, processor or logic circuit to perform the above method.

In another aspect, the disclosure describes a system for controlling a bank angle ($\phi$) of an aircraft during flight. The system comprises:

- one or more computers operatively coupled to receive one or more signals indicative of a commanded bank angle ($\phi_{cmd}$) for the aircraft, the one or more computers being configured to:
- compute a bank angle error ($\phi_{err}$) indicative of a difference between the bank angle ($\phi$) of the aircraft and the commanded bank angle ($\phi_{cmd}$);
- compute a target rate of change ($\dot{\phi}_{des}$) for the bank angle ($\phi$) of the aircraft using a sliding mode control technique, an input to the sliding mode control technique including the bank angle error ($\phi_{err}$);
- compute a target body roll rate ($P_c$) for the aircraft using a feedback linearization (FL) control technique, an input to the FL control technique including the target rate of change ($\dot{\phi}_{des}$) for the bank angle ($\phi$) of the aircraft; and use the target body roll rate ($P_c$) to control one or more actuators of the aircraft during flight.

The FL control technique may include using an inversion of a relationship between the bank angle ($\phi$) of the aircraft and one or more body angular rates of the aircraft to calculate the target body roll rate ($P_c$) for the aircraft.

The FL control technique may include computing the target body roll rate ($P_c$) using the following formula: $P_c=\dot{\phi}_{des}-\tan\hat{\theta}\sin\hat{\phi}\hat{Q}-\tan\hat{\theta}\tan\hat{\phi}\hat{R}$, where $\hat{\theta}$ denotes a value indicative of a pitch angle of the aircraft, $\hat{\phi}$ denotes a value indicative of the bank angle ($\phi$) of the aircraft, $\hat{Q}$ denotes a value indicative of a body pitch rate of the aircraft, and $\hat{R}$ denotes a value indicative of a body yaw rate of the aircraft.

The sliding mode control technique may include generating the target rate of change ($\dot{\phi}_{des}$) of the bank angle ($\phi$) as a function of the bank angle error ($\phi_{err}$), a first threshold ($C_{\phi,1}$), a second threshold ($C_{\phi,2}$) and a third threshold ($C_{\phi,3}$) such that the target rate of change ($\dot{\phi}_{des}$) of the bank angle ($\phi$) when an absolute value of the bank angle error ($\phi_{err}$) is greater than the first threshold ($C_{\phi,1}$), is chosen to be substantially equal to a bank angle saturation rate ($\dot{\phi}_{lim}$).

When the absolute value of the bank angle error ($\phi_{err}$) is less than the first threshold ($C_{\phi,1}$) and greater than the second threshold ($C_{\phi,2}$), the target rate of change ($\dot{\phi}$des) of the bank angle ($\phi$) may be computed using the following formula.

$$\dot{\phi}_{des}=\text{sign}(\phi_{err})\sqrt{2k_\phi^2C_{\phi,2}\left(|\phi_{err}|-\frac{C_{\phi,2}}{2}\right)},$$

where $\phi_{err}$ denotes the bank angle error, sign($\phi_{err}$) is a signum function of the bank angle error ($\phi_{err}$) and $k_\phi$ denotes a parameter.

When the absolute value of the bank angle error ($\phi_{err}$) is less than the third threshold ($C_{\phi,3}$), the target rate of change ($\dot{\phi}_{des}$) of the bank angle ($\phi$) may be chosen to be based on a proportional-integral-derivative control function of the bank angle error ($\phi_{err}$).

When the absolute value of the bank angle error ($\phi_{err}$) is less than the second threshold ($C_{\phi,2}$) and greater than the third threshold ($C_{\phi,3}$), the target rate of change ($\dot{\phi}_{des}$) of the bank angle ($\phi$) may be chosen to be substantially proportional to the bank angle error ($\phi_{err}$).

When the absolute value of the bank angle error ($\phi_{err}$) is less than the second threshold ($C_{\phi,2}$) and greater than the third threshold ($C_{\phi,3}$), the target rate of change ($\dot{\phi}_{des}$) of the bank angle ($\phi$) may be computed according to the following formula: $\dot{\phi}_{des}=k_\phi\phi_{err}$, where $k_\phi$ denotes a or the parameter.

The sliding mode control technique may include using a sigmoid function as a mapping between the target rate of change ($\dot{\phi}_{des}$) of the bank angle ($\phi$) and the bank angle error ($\phi_{err}$).

Embodiments may include combinations of the above features.

In another aspect, the disclosure describes a method for controlling a heading angle ($\psi$) of an aircraft during flight. The method comprises:

receiving a commanded heading angle ($\psi_{cmd}$) for the aircraft;

computing a heading angle error ($\psi_{err}$) indicative of a difference between the heading angle ($\psi$) of the aircraft and the commanded heading angle ($\psi_{cmd}$);

computing a target rate of change ($\dot{\psi}_{des}$) for the heading angle ($\psi$) of the aircraft using a sliding mode control technique, an input of the sliding mode control technique including the heading angle error ($\psi_{err}$);

computing a commanded bank angle ($\phi_{cmd}$) for the aircraft using a feedback linearization (FL) control technique, an input to the FL control technique including the target rate of change ($\dot{\psi}_{des}$) for the heading angle ($\psi$) of the aircraft; and using the commanded bank angle ($\phi_{cmd}$) to control one or more actuators of the aircraft during flight.

The FL control technique may include using an inversion of a relationship between the heading angle ($\psi$) of the aircraft and a bank angle ($\phi$) of the aircraft to calculate the commanded bank angle ($\phi_{cmd}$).

The FL control technique may include computing the commanded bank angle ($\phi_{cmd}$) using the following formula:

$$\phi_{cmd}=\arctan\left(\frac{\dot{\psi}_{des}\hat{V}_T}{g}\right),$$

where $\hat{V}_T$ is indicative of a true air speed of the aircraft, and g denotes gravitational acceleration.

The sliding mode control technique may include generating the target rate of change ($\dot{\psi}_{des}$) of the heading angle ($\psi$), as a function of the heading angle error ($\psi_{err}$), a first threshold ($C_{\psi,1}$), a second threshold ($C_{\psi,2}$), and a third threshold ($C_{\psi,3}$) such that the target rate of change ($\dot{\Psi}_{des}$) of the heading angle ($\psi$), when an absolute value of the heading angle error ($\psi_{err}$) is greater than the first threshold ($C_{\psi,1}$), is chosen to be substantially equal to a heading angle saturation rate ($\dot{\psi}_{lim}$).

When the absolute value of the heading angle error ($\psi_{err}$) is less than the first threshold ($C_{\psi,1}$) and greater than the second threshold ($C_{\psi,2}$), the target rate of change ($\dot{\psi}_{des}$) of the heading angle ($\psi$) may be computed using the following formula:

$$\dot{\psi}_{des}=\text{sign}(\psi_{err})\sqrt{2\left(\frac{\dot{\psi}_{lim}^2}{2C_{\psi,1}-C_{\psi,2}}\right)\left(|\psi_{err}|-\frac{C_{\psi,2}}{2}\right)},$$

where sign($\psi_{err}$) is a signum function of the heading angle error ($\psi_{err}$).

When the absolute value of the heading angle error ($\psi_{err}$) is less than the third threshold ($C_{\psi,3}$), the target rate of change ($\dot{\psi}_{des}$) of the heading angle ($\psi$) may be chosen to be based on a proportional-integral-derivative control function of the heading angle error ($\psi_{err}$).

When the absolute value of the heading angle error ($\psi_{err}$) is less than the third threshold ($C_{\psi,3}$), a proportional term in the proportional-integral-derivative control function may be substantially equal to $$\left(\sqrt{\frac{\dot{\psi}_{lim}^2}{C_{\psi,2}(2C_{\psi,1}-C_{\psi,2})}}\right)\psi_{err}.$$

When the absolute value of the heading angle error ($\psi_{err}$) is less than the second threshold ($C_{\psi,2}$) and greater than the third threshold ($C_{\psi,3}$), the target rate of change ($\dot{\psi}_{des}$) of the heading angle ($\psi$) may be chosen to be substantially proportional to the heading angle error ($\psi_{err}$).

When the absolute value of the heading angle error ($\psi_{err}$) is less than the second threshold ($C_{\psi,2}$) and greater than the third threshold ($C_{\psi,3}$), the target rate of change ($\dot{\psi}_{des}$) of the heading angle ($\psi$) may be computed according to the following formula:

$$\dot{\psi}_{des} = \left(\sqrt{\frac{\dot{\psi}_{lim}^2}{C_{\psi,2}(2C_{\psi,1} - C_{\psi,2})}}\right)\psi_{err}.$$

The sliding mode control technique may include using a sigmoid function as a mapping between the target rate of change ($\dot{\psi}_{des}$) of the heading angle ($\psi$) and the heading angle error ($\psi_{err}$).

In some embodiments of the method:

the FL control technique may be a first FL control technique;

the sliding mode control technique may be a first sliding mode control technique; and using the commanded bank angle ($\phi_{cmd}$) to control the one or more actuators of the aircraft during flight may comprise:

computing a bank angle error ($\phi_{err}$) indicative of a difference between the bank angle ($\phi$) of the aircraft and the commanded bank angle ($\phi_{cmd}$);

computing a target rate of change ($\dot{\phi}_{des}$) for the bank angle ($\phi$) of the aircraft using a second sliding mode control technique, an input to the second sliding mode control technique including the bank angle error ($\phi_{err}$);

computing a target body roll rate ($P_c$) for the aircraft using a second FL control technique, an input to the second FL control technique including the target rate of change ($\dot{\phi}_{des}$) for the bank angle ($\phi$) of the aircraft; and using the target body roll rate ($P_c$) to control the one or more actuators of the aircraft during flight.

The aircraft may be a blended wing body aircraft.

Embodiments may include combinations of the above features.

In another aspect, the disclosure describes a computer program product for implementing a heading angle control function of an aircraft during flight, the computer program product comprising a non-transitory machine-readable storage medium having program code embodied therewith, the program code readable/executable by a computer, processor or logic circuit to perform the above method.

In another aspect, the disclosure describes a system for controlling a heading angle ($\psi$) of an aircraft during flight. The system comprises:

one or more computers operatively coupled to receive one or more signals indicative of a commanded heading angle ($\psi_{cmd}$) for the aircraft, the one or more computers being configured to:

compute a heading angle error ($\psi_{err}$) indicative of a difference between the heading angle ($\psi$) of the aircraft and the commanded heading angle ($\psi_{cmd}$);

compute a target rate of change ($\dot{\psi}_{des}$) for the heading angle ($\psi$) of the aircraft using a sliding mode control technique, an input of the sliding mode control technique including the heading angle error ($\psi_{err}$);

compute a commanded bank angle ($\phi_{cmd}$) for the aircraft using a feedback linearization (FL) control technique, an input to the FL control technique including the target rate of change ($\dot{\psi}_{des}$) for the heading angle ($\psi$) of the aircraft; and use the commanded bank angle ($\phi_{cmd}$) to control one or more actuators of the aircraft during flight.

The FL control technique may include using an inversion of a relationship between the heading angle ($\psi$) of the aircraft and a bank angle ($\phi$) of the aircraft to calculate the commanded bank angle ($\phi_{cmd}$).

The FL control technique may include computing the commanded bank angle ($\phi_{cmd}$) using the following formula:

$$\phi_{cmd} = \arctan\left(\frac{\dot{\psi}_{des}\hat{V}_T}{g}\right),$$

where $\hat{V}_T$ is indicative of a true air speed of the aircraft, and g denotes gravitational acceleration.

The sliding mode control technique may include generating the target rate of change ($\dot{\psi}_{des}$) of the heading angle ($\psi$), as a function of the heading angle error ($\psi_{err}$), a first threshold ($C_{\psi,1}$), a second threshold ($C_{\psi,2}$), and a third threshold ($C_{\psi,3}$) such that the target rate of change ($\dot{\psi}_{des}$) of the heading angle ($\psi$), when an absolute value of the heading angle error ($\psi_{err}$) is greater than the first threshold ($C_{\psi,1}$), is chosen to be substantially equal to a heading angle saturation rate ($\dot{\psi}_{lim}$).

When the absolute value of the heading angle error ($\psi_{err}$) is less than the first threshold ($C_{\psi,1}$) and greater than the second threshold ($C_{\psi,2}$), the target rate of change ($\dot{\psi}_{des}$) of the heading angle ($\psi$) may be computed using the following formula:

$$\dot{\psi}_{des} = \text{sign}(\psi_{err})\sqrt{2\left(\frac{\dot{\psi}_{lim}^2}{2C_{\psi,1} - C_{\psi,2}}\right)\left(|\psi_{err}| - \frac{C_{\psi,2}}{2}\right)},$$

where sign($\psi_{err}$) is a signum function of the heading angle error ($\psi_{err}$).

When the absolute value of the heading angle error ($\psi_{err}$) is less than the third threshold ($C_{\psi,3}$), the target rate of change ($\dot{\psi}_{des}$) of the heading angle ($\psi$) may be chosen to be based on a proportional-integral-derivative control function of the heading angle error ($\psi_{err}$).

When the absolute value of the heading angle error ($\psi_{err}$) is less than the third threshold ($C_{\psi,3}$), a proportional term in the proportional-integral-derivative control function may be substantially equal to $$\left(\sqrt{\frac{\dot{\psi}_{lim}^2}{C_{\psi,2}(2C_{\psi,1} - C_{\psi,2})}}\right)\psi_{err}.$$

When the absolute value of the heading angle error ($\psi_{err}$) is less than the second threshold ($C_{\psi,2}$) and greater than the third threshold ($C_{\psi,3}$), the target rate of change ($\dot{\psi}_{des}$) of the heading angle ($\psi$) may be chosen to be substantially proportional to the heading angle error ($\psi_{err}$).

When the absolute value of the heading angle error ($\psi_{err}$) is less than the second threshold ($C_{\psi,2}$) and greater than the third threshold ($C_{\psi,3}$), the target rate of change ($\dot{\psi}_{des}$) of the heading angle ($\psi$) may be computed according to the following formula:

$$\dot{\psi}_{des} = \left(\sqrt{\frac{\dot{\psi}_{lim}^2}{C_{\psi,2}(2C_{\psi,1} - C_{\psi,2})}}\right)\psi_{err}.$$

The sliding mode control technique may include using a sigmoid function as a mapping between the target rate of change ($\dot{\psi}_{des}$) of the heading angle ($\psi$) and the heading angle error ($\psi_{err}$).

In some embodiments of the system:

- the FL control technique may be a first FL control technique;
- the sliding mode control technique may be a first sliding mode control technique; and
- using the commanded bank angle ($\phi_{cmd}$) to control the one or more actuators of the aircraft during flight may comprise:
- computing a bank angle error ($\phi_{err}$) indicative of a difference between the bank angle ($\phi$) of the aircraft and the commanded bank angle ($\phi_{cmd}$);
- computing a target rate of change ($\dot{\phi}_{des}$) for the bank angle ($\phi$) of the aircraft using a second sliding mode control technique, an input to the second sliding mode control technique including the bank angle error ($\phi_{err}$);
- computing a target body roll rate ($P_c$) for the aircraft using a second FL control technique, an input to the FL control technique including the target rate of change ($\dot{\phi}_{des}$) for the bank angle ($\phi$) of the aircraft; and
- using the target body roll rate ($P_c$) to control the one or more actuators of the aircraft during flight.

Embodiments may include combinations of the above features.

In another aspect, the disclosure describes a method for controlling an altitude (h) of an aircraft during flight. The method comprises:

- receiving a commanded altitude ($h_{cmd}$) for the aircraft;
- computing an altitude error ($h_{err}$) indicative of a difference between the altitude (h) of the aircraft and the commanded altitude ($h_{cmd}$);
- computing a target rate of change ($\dot{h}_{des}$) for the altitude (h) of the aircraft using a sliding mode control technique, an input to the sliding mode control technique including the altitude error ($h_{err}$);
- computing a value indicative of a target change in thrust force for the aircraft using a feedback linearization (FL) control technique, an input to the FL control technique including the target rate of change ($\dot{h}_{des}$) of the altitude (h) of the aircraft; and
- using the value to control one or more actuators of the aircraft during flight.

The value may be a target change in thrust lever angle of the aircraft.

The FL control technique may include using an inversion of a relationship between the altitude (h) of the aircraft and an air speed of the aircraft to calculate the value.

The FL control technique may include:

- determining rate of change ($\dot{\hat{V}}_T$) of a true air speed ($\hat{V}_T$) of the aircraft; and
- computing the target change in thrust force ($\Delta T_c$) using the following formula:

$$\Delta T_c = \frac{m}{\hat{V}_T}\left(g\dot{h}_{des} + \hat{V}_T\dot{\hat{V}}_T\right),$$

where g denotes a value of a gravitational acceleration, and m denotes a mass of the aircraft.

The sliding mode control technique may include generating the target rate of change ($\dot{h}_{des}$) of the altitude (h), as a function of the altitude error ($h_{err}$), a first threshold ($C_{h,1}$), a second threshold ($C_{h,2}$), and a third threshold ($C_{h,3}$) such that the target rate of change ($\dot{h}_{des}$) of the altitude (h) of the aircraft, when the absolute value of the altitude error ($h_{err}$) is greater than the first threshold ($C_{h,1}$), is chosen to be substantially equal to an altitude saturation rate ($\dot{h}_{lim}$).

The absolute value of the altitude error ($h_{err}$) may be less than the first threshold ($C_{h,1}$) and greater than the second threshold ($C_{h,2}$), the target rate of change ($\dot{h}_{des}$) of the altitude (h) may be computed using the following formula:

$$\dot{h}_{des} = \text{sign}(h_{err})\sqrt{2\left(\frac{\dot{h}_{lim}^2}{2C_{h,1} - C_{h,2}}\right)\left(|h_{err}| - \frac{C_{h,2}}{2}\right)},$$

where sign($h_{err}$) is a signum function of the altitude error ($h_{err}$).

When the absolute value of the altitude error ($h_{err}$) is less than the third threshold ($C_{h,3}$), the target rate of change ($\dot{h}_{des}$) of the altitude (h) may be chosen based on a proportional-integral-derivative control function of the altitude error ($h_{err}$).

When the absolute value of the altitude error ($h_{err}$) is less than the third threshold $C_{h,3}$, a proportional term in the proportional-integral-derivative control function may be substantially equal to $$\left(\sqrt{\frac{\dot{h}_{lim}^2}{C_{h,2}(2C_{h,1} - C_{h,2})}}\right)h_{err}.$$

When the absolute value of the altitude error ($h_{err}$) is less than the second threshold ($C_{h,2}$) and greater than the third threshold ($C_{h,3}$), the target rate of change ($\dot{h}_{des}$) of the altitude (h) may be chosen to be proportional to the altitude error ($h_{err}$).

When the absolute value of the altitude error ($h_{err}$) is less than the second threshold ($C_{h,2}$) and greater than the third threshold ($C_{h,3}$), the target rate of change ($\dot{h}_{des}$) of the altitude (h) may be computed using the following formula:

$$\dot{h}_{des} = \left(\sqrt{\frac{\dot{h}_{lim}^2}{C_{h,2}(2C_{h,1} - C_{h,2})}}\right)h_{err}.$$

The sliding mode control technique may include using a sigmoid function as a mapping between the target rate of change ($\dot{h}_{des}$) of the altitude (h) and the altitude error ($h_{err}$).

The aircraft may be a blended wing body aircraft.

Embodiments may include combinations of the above features.

In another aspect, the disclosure describes a computer program product for implementing an altitude control function of an aircraft during flight, the computer program product comprising a non-transitory machine-readable storage medium having program code embodied therewith, the program code readable/executable by a computer, processor or logic circuit to perform the above method.

In another aspect, the disclosure describes a system for controlling an altitude (h) of an aircraft during flight. The system comprises:

- one or more computers operatively coupled to receive one or more signals indicative of a commanded altitude ($h_{cmd}$) for the aircraft, the one or more computers being configured to:

compute an altitude error ($h_{err}$) indicative of a difference between the altitude (h) of the aircraft and the commanded altitude ($h_{cmd}$);

compute a target rate of change ($\dot{h}_{des}$) for the altitude (h) of the aircraft using a sliding mode control technique, an input to the sliding mode control technique including the altitude error ($h_{err}$);

compute a value indicative of a target change in thrust force for the aircraft using a feedback linearization control technique, an input to the FL control technique including the target rate of change ($\dot{h}_{des}$) of the altitude (h) of the aircraft; and using the value to control one or more actuators of the aircraft during flight.

The value may be a target change in thrust lever angle of the aircraft.

The FL control technique may include using an inversion of a relationship between the altitude (h) of the aircraft and an air speed of the aircraft to calculate the value.

The FL control technique may include:

determining rate of change ($\dot{\hat{V}}_T$) of a true air speed ($\hat{V}_T$) of the aircraft; and computing the target change in thrust lever angle ($\Delta T_c$) using the following formula:

$$\Delta T_c = \frac{m}{\hat{V}_T}\left(g\dot{h}_{des} + \hat{V}_T\dot{\hat{V}}_T\right),$$

where g denotes a value of a gravitational acceleration, and m denotes a mass of the aircraft.

The sliding mode control technique may include generating the target rate of change ($\dot{h}_{des}$) of the altitude (h), as a function of the altitude error ($h_{err}$), a first threshold ($C_{h,1}$), a second threshold ($C_{h,2}$), and a third threshold ($C_{h,3}$) such that the target rate of change ($\dot{h}_{des}$) of the altitude (h) of the aircraft, when the absolute value of the altitude error ($h_{err}$) is greater than the first threshold ($C_{h,1}$), is chosen to be substantially equal to an altitude saturation rate ($\dot{h}_{lim}$).

When the absolute value of the altitude error ($h_{err}$) is less than the first threshold ($C_{h,1}$) and greater than the second threshold ($C_{h,2}$), the target rate of change ($\dot{h}_{des}$) of the altitude (h) may be computed using the following formula:

$$\dot{h}_{des} = \text{sign}(h_{err})\sqrt{2\left(\frac{\dot{h}_{lim}^2}{2C_{h,1} - C_{h,2}}\right)\left(|h_{err}| - \frac{C_{h,2}}{2}\right)},$$

where $\text{sign}(h_{err})$ is a signum function of the altitude error ($h_{err}$).

When the absolute value of the altitude error ($h_{err}$) is less than the third threshold ($C_{h,3}$), the target rate of change ($\dot{h}_{des}$) of the altitude (h) is chosen based on a proportional-integral-derivative control function of the altitude error ($h_{err}$).

When the absolute value of the altitude error ($h_{err}$) is less than the third threshold $C_{h,3}$, a proportional term in the proportional-integral-derivative control function is substantially equal to $$\left(\sqrt{\frac{\dot{h}_{lim}^2}{C_{h,2}(2C_{h,1} - C_{h,2})}}\right)h_{err}.$$

When the absolute value of the altitude error ($h_{err}$) is less than the second threshold ($C_{h,2}$) and greater than the third threshold ($C_{h,3}$), the target rate of change ($\dot{h}_{des}$) of the altitude (h) may be chosen to be proportional to the altitude error ($h_{err}$).

When the absolute value of the altitude error ($h_{err}$) is less than the second threshold ($C_{h,2}$) and greater than the third threshold ($C_{h,3}$), the target rate of change ($\dot{h}_{des}$) of the altitude (h) may be computed using the following formula:

$$\dot{h}_{des} = \left(\sqrt{\frac{\dot{h}_{lim}^2}{C_{h,2}(2C_{h,1} - C_{h,2})}}\right)h_{err}.$$

The sliding mode control technique may include using a sigmoid function as a mapping between the target rate of change ($\dot{h}_{des}$) of the altitude (h) and the altitude error ($h_{err}$).

Embodiments may include combinations of the above features.

In another aspect, the disclosure describes an aircraft comprising a system as described herein. The aircraft may be a blended wing body aircraft.

DESCRIPTION OF THE DRAWINGS

Reference is now made to the accompanying drawings, in which.

DETAILED DESCRIPTION

In various embodiments, systems and methods described herein can facilitate the development of aircraft control systems for controlling bank angle, heading angle, and/or altitude. In some embodiments, the systems and methods described herein can utilize a combination of sliding mode and/or nonlinear dynamic inversion control techniques.

Sliding mode control (SMC) is a model-based nonlinear control technique where the dynamics of the error, i.e. a variable indicative of the difference between a state variable and the associated commanded value of the variable, can be constrained via a control input that evolves along a sub-manifold (the sliding surface) of the corresponding phase space. The sub-manifold can be chosen so that the error evolves towards an origin when the error dynamics are constrained to the sub-manifold.

In some embodiments, the methods and systems described herein may include a model-based nonlinear control technique such as nonlinear dynamic inversion (NDI) in which a first (i.e., inner loop) control technique, called feedback linearization (FL), is used to counteract the nonlinearity in the dynamics to effectively yield linear dynamics and a second (i.e., outer loop) control technique such as SMC is used to control the resulting effectively linear dynamics. The use of model-based nonlinear control techniques can significantly reduce the need for scheduling/tuning one or more control parameters, e.g. controller gains, over the entire operating envelope of the aircraft because the resulting control system can automatically adjust to flight variations by utilizing the dynamical model of the aircraft. Accordingly, the desired control system performance can be more consistently maintained over the flight envelope (e.g., altitude, speed) and over the load envelope (e.g., mass, center of gravity (CG) location, inertia). In some embodiments, the methods and systems described herein can facilitate the development of control systems for new aircraft designs by potentially reducing the level of effort required compared to conventional approaches.

In some embodiments, the methods and systems described herein can also be used to emulate the behavior of a human pilot in an unmanned aircraft to permit such unmanned aircraft to autonomously follow a trajectory defined by waypoints or perform scripted maneuvers as a function of time. In some embodiments, the methods and systems described herein can provide autopilot-type functions that can autonomously and relatively smoothly execute both aggressive (e.g., large angle) maneuvers as well as more gentle (e.g., small angle) maneuvers.

The term "substantially" as used herein may be applied to modify any quantitative representation which could permissibly vary without resulting in a change in the basic function to which it is related.

Figure 1A:
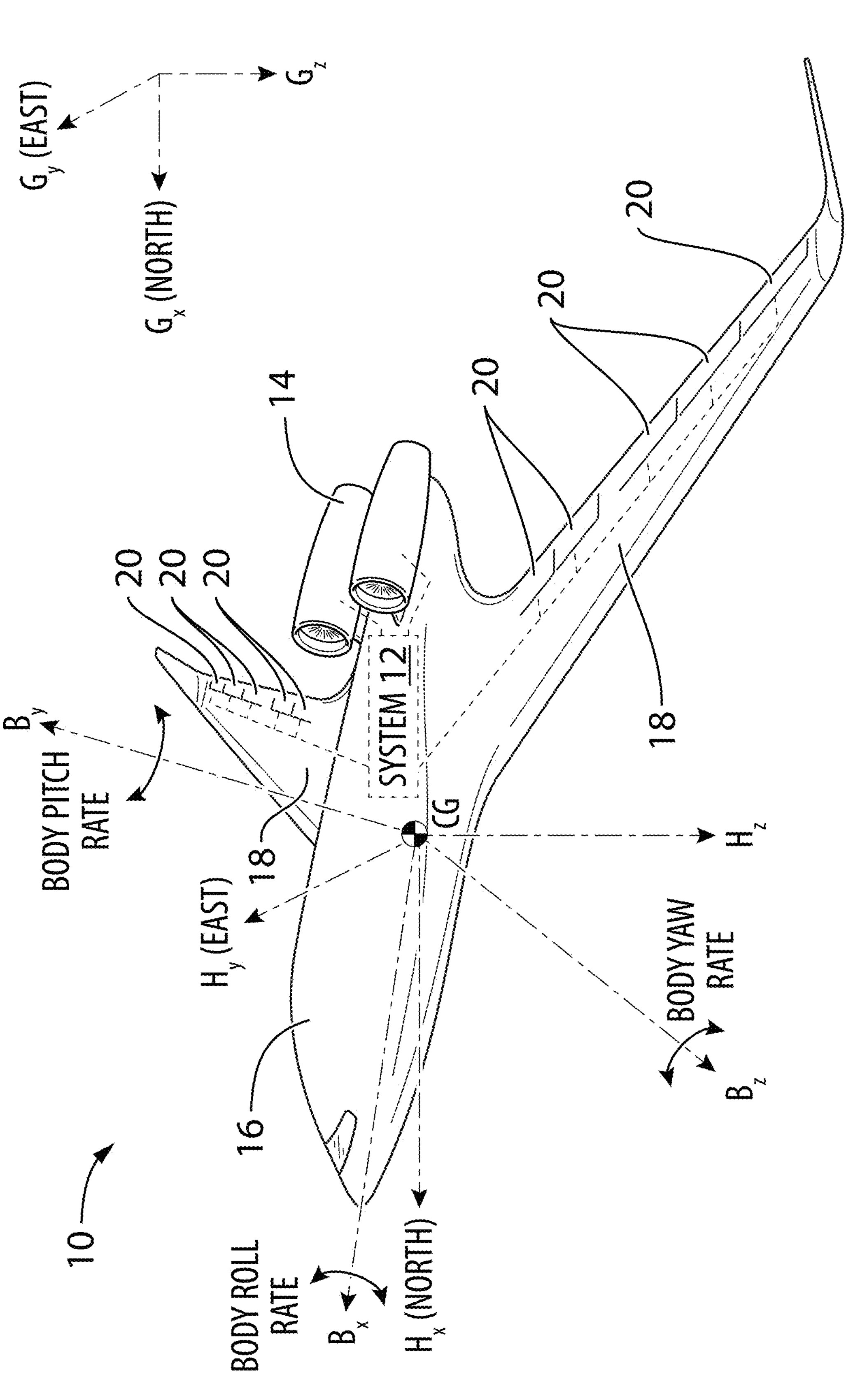
FIG. 1A is a perspective view of an exemplary aircraft including a control system as disclosed herein.

FIG. 1A is a perspective view of an exemplary aircraft 10 which can comprise system 12 (shown schematically) for controlling some aspect(s) of operation of aircraft 10 during flight.

Figure 1B:
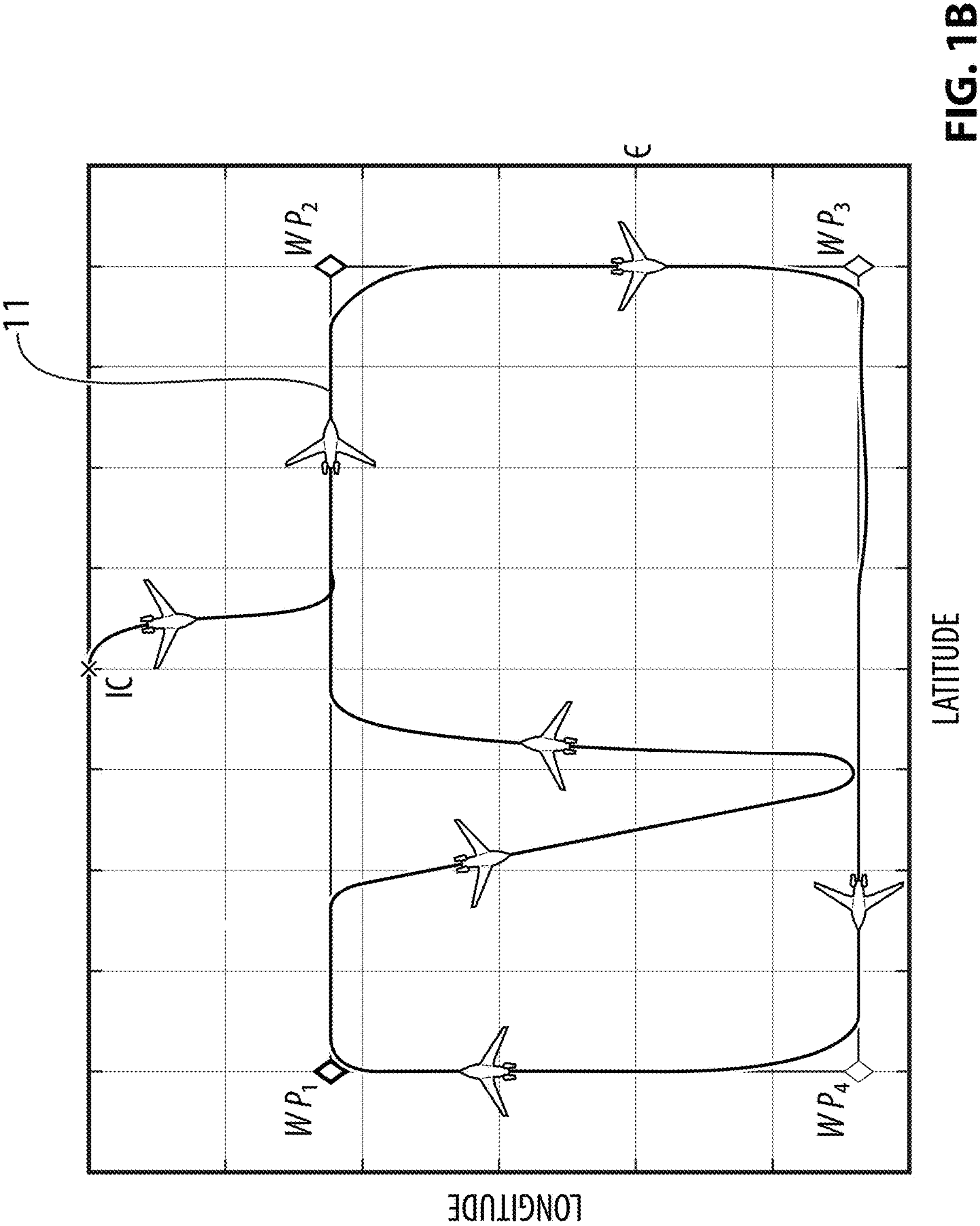
FIG. 1B is a graphic representation of an exemplary trajectory to be executed by the aircraft of FIG. 1A.

FIG. 1B is a graphic representation of an exemplary two-dimensional projection of a trajectory 11 to be executed by aircraft 10, i.e. a trajectory with respect to two-dimensional geographic coordinates (latitude and longitude). Trajectory 11 can be at least partially defined by a starting location IC and waypoints $WP_1$-$WP_4$, for example. The trajectory 11 in FIG. 1B may be a trajectory for a manned or unmanned aircraft.

Figure 1C:
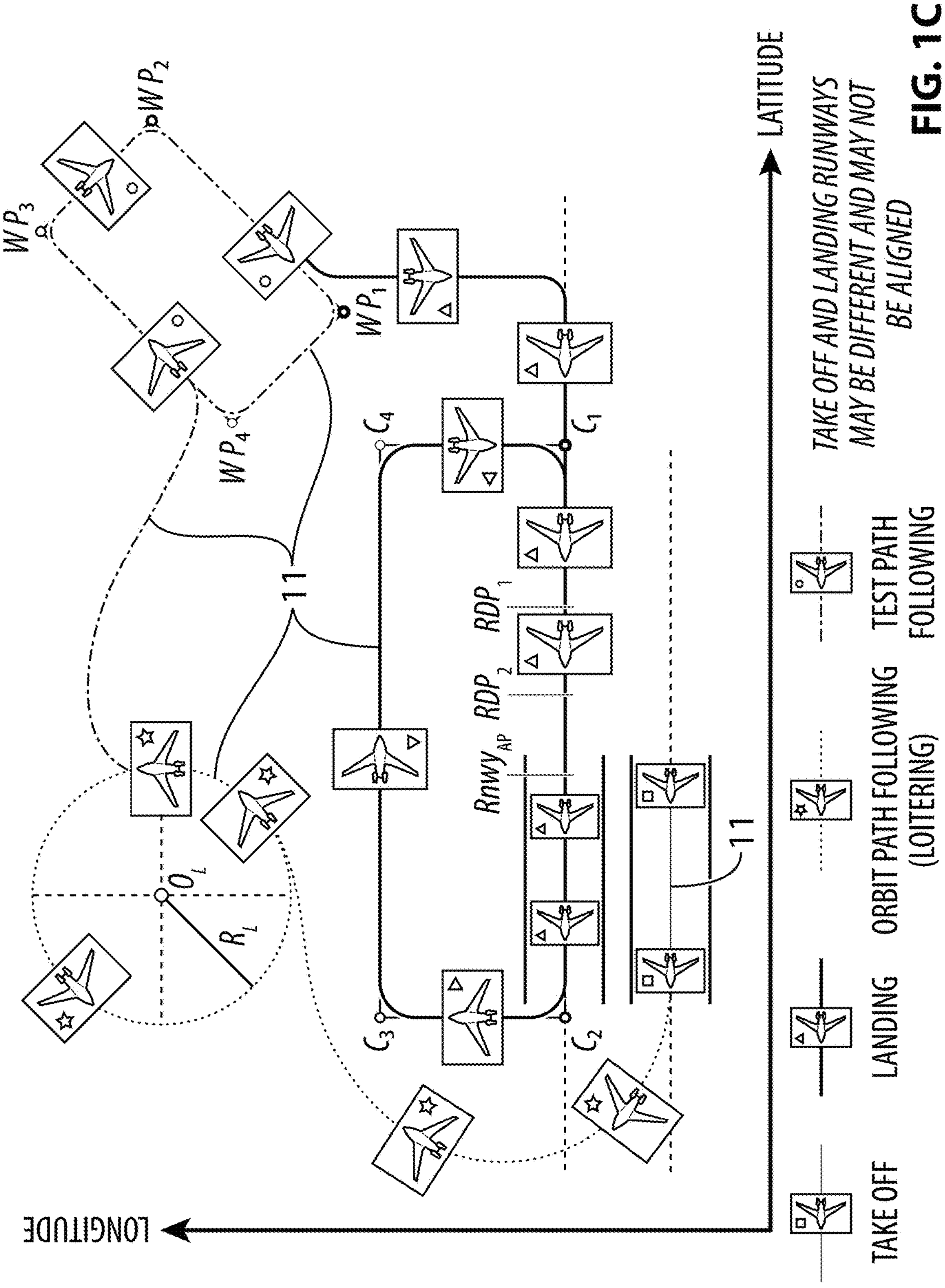
FIG. 1C is a graphic representation of another exemplary trajectory to be executed by the aircraft of FIG. 1A.

FIG. 1C is a graphic representation of another exemplary two-dimensional projection of a trajectory 11 to be executed by aircraft 10. Trajectory 11 of FIG. 1C may be defined in part by waypoints or geographic coordinates that may include latitude, longitude and altitude. The trajectory 11 may include take-off, landing, orbit following (loitering), test path following, waypoint tracking and/or other types of maneuvers that aircraft 10 (of BWB or other type) may be required to carry out. The systems and methods described herein may facilitate carrying out such maneuvers and waypoint tracking. The methods and systems described herein may be suitable for facilitating the execution of two-dimensional or three-dimensional trajectories by aircraft 10. The trajectory 11 in FIG. 1C may be a trajectory for a manned or unmanned aircraft.

In reference to FIG. 1A, aircraft 10 can be any type of manned or unmanned aircraft (e.g., drones) such as corporate, private, commercial and passenger aircraft. For example, aircraft 10 can be a turboprop aircraft, a (e.g., ultra-long range) business jet or a narrow-body, twin-engine jet airliner. Aircraft 10 can be a fixed-wing aircraft comprising one or more engines 14. The exemplary aircraft 10 shown in FIG. 1A is a blended wing body (BWB) aircraft. The use of the systems and methods disclosed herein can be particularly advantageous for BWB aircraft that have nonlinear flight dynamics that can also vary based on changes in location of the center-of-gravity CG during flight of such aircraft 10. However, it is understood that system 12 and the methods described herein are applicable to other types of aircraft as well.

Aircraft 10 can have center body 16 having a fore end at which a cockpit can be located, and an aft end. Center body 16 can be airfoil-shaped such as to be able to generate lift. Aircraft 10 can be tailless but a tail structure can alternatively be provided at the aft end of center body 16. A canard can be provided on a fore portion of center body 16. Wings 18 can project laterally from opposite sides of center body 16. Engine(s) 14 can be mounted to the aft end of the center body 16. Alternately or in addition, engine(s) 14 could be mounted to wings 18 or they could be fully or partially embedded within center body 16 or wings 18. BWB aircraft designs are sometimes also referred to as "hybrid wing body" aircraft designs. As referenced herein, terms "blended wing body" and "BWB" are intended to encompass designs referred to as "hybrid wing body" designs.

Aircraft 10 can include one or more suitable flight control surfaces 20 configured to interact with air flowing around aircraft 10 during flight. Control system 12 can be operatively coupled to one or more of such flight control surfaces 20. One or more of such flight control surfaces 20 can be movably mounted to wings 18 and/or other part(s) of aircraft 10 and can be configured to cause rotation of aircraft 10 about axes $B_x$, $B_y$ and/or $B_z$ during flight. For example, one or more flight control surfaces 20 of aircraft 10 can be bank angle control flight control surfaces (e.g., ailerons, elevons)

movably mounted to wings 18 in case of a BWB aircraft or to a horizontal stabilizer of an empennage in case of a traditional aircraft configuration. Such bank angle control flight control surfaces can be considered primary flight control surfaces that cause aircraft 10 to move (i.e., rotate) about horizontal or lateral axis $B_y$ during flight. In other words, movement of the bank angle control flight control surfaces in flight can cause aircraft 10 to roll. A flight control surface can be hinged to a trailing edge of wing 18 or of a horizontal stabilizer and can be controllably movable. Aircraft 10 can also include one or more actuators to adjust the thrust generated by one or more engines 14. In some embodiments, engines 14 are gas turbine engines. In such embodiments, actuators can adjust fuel supply to engines 14 to decrease or increase the thrust generated by one or more engines 14. Such thrust adjustment can, in some embodiments, be used to adjust the orientation of aircraft 10 during flight.

The rotation of aircraft 10 can be measured with respect to different coordinate systems. For example, an earth-fixed coordinate system can have a fixed origin on earth, an axis $G_x$ aligned with the geographical north, an axis $G_y$ aligned with geographical east, and an axis $G_z$ pointing vertically downwards. A body-fixed coordinate system can have a fixed origin that is coincident with a centre-of-gravity CG of aircraft 10 and can have an axis $B_x$ oriented towards the nose of aircraft 10, an axis $B_y$ oriented laterally towards the right wing of aircraft 10, and an axis $B_z$ that is perpendicular to both $B_x$ and $B_y$ and is oriented towards the belly of aircraft 10. A moving-earth coordinate system can be defined by translating the earth-fixed coordinate system so that its origin is coincident with centre-of-gravity CG of aircraft 10. The moving-earth coordinate system can have axis $H_x$ aligned with the geographical north, an axis $H_y$ aligned with geographical east, and an axis $H_z$ pointing vertically downwards.

The orientation of aircraft 10 can be described by rotating the moving-earth coordinate system ($H_x$, $H_y$, $H_z$) sequentially along three different axes so that the moving-earth coordinate system ($H_x$, $H_y$, $H_z$) aligns with the body-fixed coordinate system ($B_x$, $B_y$, $B_z$). When such a rotation is performed using the yaw-pitch-roll convention described below, three standard aircraft orientation angles can be defined: heading angle $\psi$, pitch angle $\theta$, and bank angle $\phi$. The moving-earth coordinate system can first be rotated about $H_z$ through a yaw or heading angle $\psi$ to yield a first intermediate coordinate system ($H_{x(1)}$, $H_{y(1)}$, $H_{z(1)}$). The first intermediate coordinate system can then rotated about $H_{y(1)}$ through a pitch angle $\theta$ to yield a second intermediate coordinate system ($H_{x(2)}$, $H_{y(2)}$, $H_{z(2)}$). Finally, the second intermediate coordinate system can then be rotated about $H_{x(2)}$ through a bank angle $\phi$ to yield the body-fixed coordinate system ($B_x$, $B_y$, $B_z$).

As aircraft 10 rotates, heading angle $\psi$, pitch angle $\theta$ and/or bank angle $\phi$ can change and aircraft 10 can acquire corresponding angular rates (with respect to time), denoted by heading angular rate $\dot{\psi}$, pitch angular rate $\dot{\theta}$ and bank angular rate $\dot{\phi}$. Associated body angular rates, denoted by body roll rate P, body pitch rate Q and body yaw rate R, can be obtained by a transformation into the body-fixed coordinate system prior to evaluating the rate of change with respect to time. The body roll rate P describes the angular rate of aircraft 10 about axis $B_x$, the body pitch rate Q describes the angular rate of aircraft 10 about axis $B_y$, and the body yaw rate R describes the angular rate of aircraft 10 about axis $B_z$. Together P, Q, and R are referred to as the body angular rates of aircraft 10. The relationship between heading angular rate $\hat{\psi}$, pitch angular rate $\dot{\theta}$ and bank angular rate $\dot{\phi}$, and body roll rate P, body pitch rate Q and body yaw rate R can be defined by the following formula:

$$\begin{pmatrix} \dot{\phi} \\ \dot{\theta} \\ \dot{\psi} \end{pmatrix} = \begin{pmatrix} 1 & \sin\phi\tan\theta & \cos\phi\tan\theta \\ 0 & \cos\phi & -\sin\phi \\ 0 & \sin\phi/\cos\theta & \cos\phi/\cos\theta \end{pmatrix} \begin{pmatrix} P \\ Q \\ R \end{pmatrix}.$$

Figure 2:
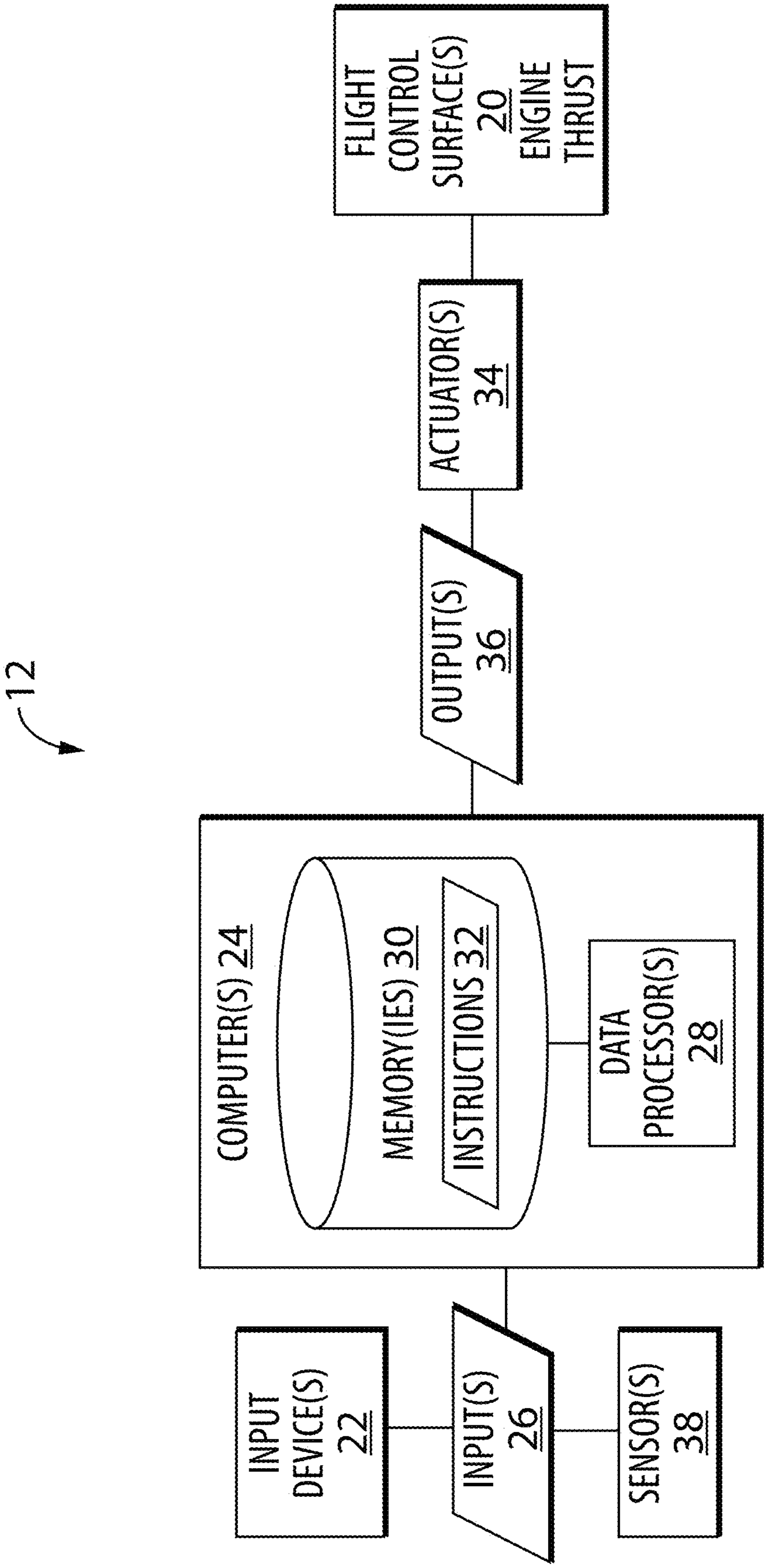
FIG. 2 is an exemplary schematic representation of a control system of the aircraft of FIG. 1A.

FIG. 2 is an exemplary schematic representation of control system 12 of aircraft 10. Control system 12 can comprise one or more pilot or operator input devices 22 for receiving input (e.g. indicative of a desired trajectory of aircraft 10) from an operator or pilot that is onboard aircraft 10 or off of aircraft 10. Such input can indicative of a desired heading angle (v), bank angle (@), or altitude (h) of aircraft 10 and can cause to control system 12 to cause movement of one or more flight control surfaces 20 of aircraft 10 or cause an increase or decrease in engine thrust, e.g. by increasing or decreasing fuel supply to a combustor of an engine 14 for example. Control system 12 can comprise one or more computers 24 (referred hereinafter in the singular) operatively coupled to pilot or operator input device 22 to receive input signals 26 indicative of the pilot or operator's desired command(s). Pilot or operator input device 22 can, for example, be a combination of a side stick, center stick, control column, keyboard or any other input device configured to receive one or more of a commanded heading angle, bank angle, and altitude. In some embodiments, the systems and methods described herein can also be used with commands generated by an auto-flight (e.g., autopilot) system of aircraft 10, or with trajectory commands (e.g., waypoints) generated based on input from a pilot or other operator located remotely from aircraft 10. Accordingly, the systems and methods disclosed herein can be used for heading angle, bank angle and/or altitude control of manned or unmanned aircraft (e.g., drones).

Computer 24 can comprise one or more data processors 28 (referred hereinafter in the singular) and one or more non-transitory memories 30 (i.e., data storage devices) (referred hereinafter in the singular) including machine-readable instructions 32 executable by data processor 28. Instructions 32 can be configured to cause computer 24 to perform one or more steps so as to implement a computer-implemented process such that instructions 32, when executed by data processor 28 or other programmable apparatus, can cause the functions/acts specified in the methods described herein to be executed. Memory 30 can comprise any storage means (e.g. devices) suitable for retrievably storing machine-readable instructions 32 executable by data processor 28 of computer 24.

Various aspects of the present disclosure can be embodied as systems, devices, methods and/or computer program products. Accordingly, aspects of the present disclosure can take the form of an entirely hardware embodiment, an entirely software embodiment or an embodiment combining software and hardware aspects. Furthermore, aspects of the present disclosure can take the form of a computer program product embodied in one or more non-transitory computer readable medium(ia) (e.g., memory 30) having computer readable program code embodied thereon. The computer program product can, for example, be executed by computer 24 to cause the execution of one or more methods disclosed herein in entirety or in part. It is understood that, based on the present disclosure, one skilled in the relevant arts could readily write computer program code for implementing the methods disclosed herein.

Computer 24 can be directly or indirectly operatively coupled to one or more physical actuators 34 (referred hereinafter in the singular) for controlling and optionally receiving feedback from physical actuator 34 associated with one or more flight control surfaces 20 and/or actuators (e.g., fuel pump(s), valve(s)) for controlling engine thrust. For example, output signal(s) 36 (e.g., command signal(s)) provided by controller 24 could be used to control physical actuator 34. Computer 24 can be considered part of a fly-by-wire system of aircraft 10. For example, computer 24 can be configured to carry out functions additional to those described herein. In some embodiments, computer 24 can be of the type known as a flight control computer (FCC) of aircraft 10. Instructions 32 can be implemented in the form of control laws (CLAWS) in a FCC of aircraft 10. Input(s) 26 to computer 24 can also comprise signals indicative of (e.g., sensed or derived) operating parameters (i.e., states) of aircraft 10. Accordingly, computer 24 can be operatively connected to receive data acquired via one or more sensors 38.

The various exemplary schematics shown and described herein are not meant to limit the scope of the present disclosure to those described but rather are meant to provide specific embodiments, which one skilled in the art can modify while remaining within the scope of the present disclosure. The present disclosure encompasses possible redistribution of sub-components into possibly different larger or smaller components or sub-components, or any other re-organization of components and sub-components.

Figure 3:
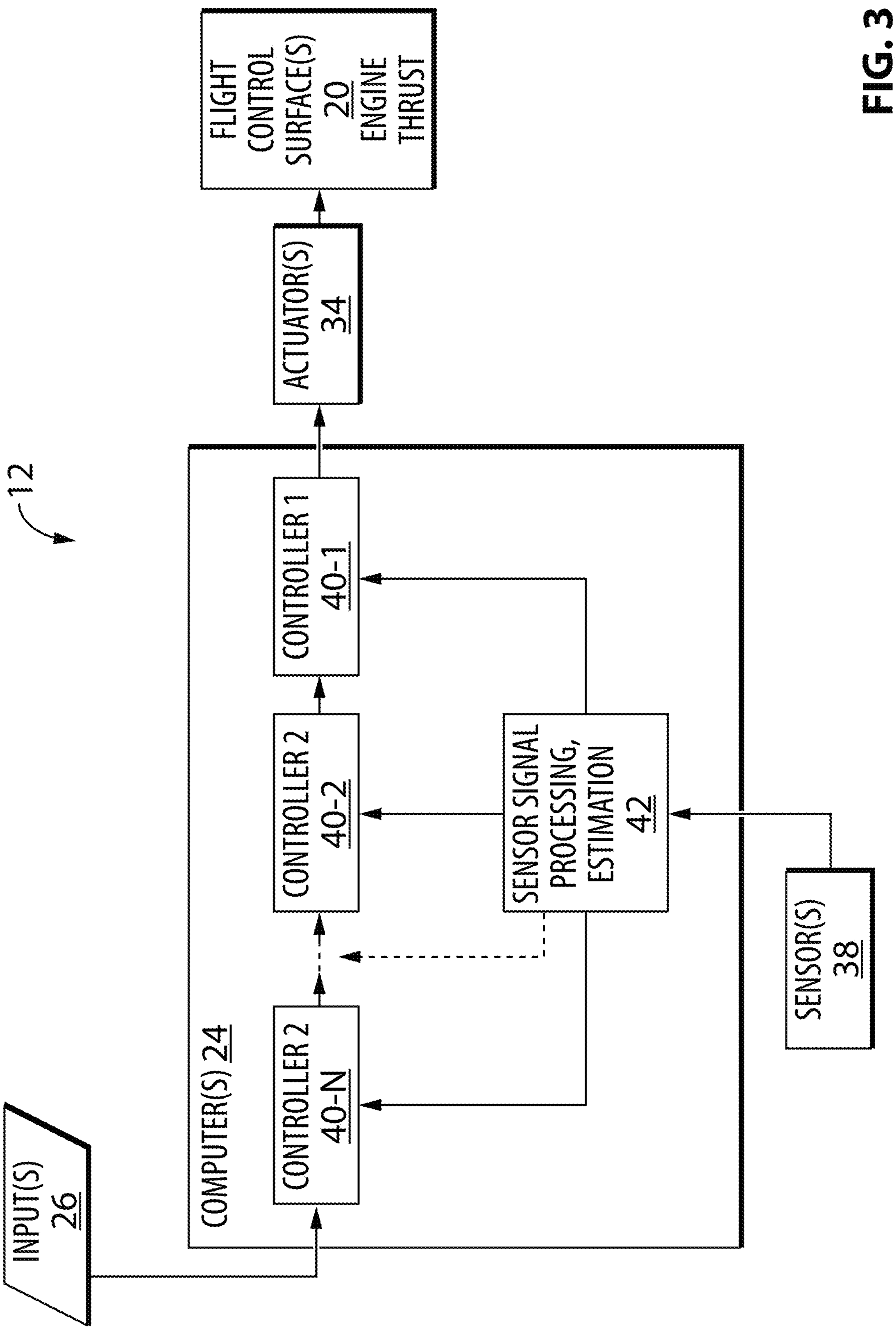
FIG. 3 is another exemplary schematic representation of the control system of the aircraft of FIG. 1A.

FIG. 3 shows an exemplary schematic representation of computer 24 operatively coupled to actuator 34 and comprising a plurality of controllers 40-1 through 40-N, where N can be any positive integer. Each controller can receive input signal from a processing block 42 to process signals received from sensors 38 and/or state estimation techniques 42, wherein state estimation techniques, e.g. Kalman filtering or Luenberger observers or others can involve receiving and/or processing data acquired from sensors 38. The controllers can be organized such that the output signal of controller 40-(M+1) is used as input signal to controller 40-M, where M is any integer between 1 and N. In such a scenario, the controller 40-M (with respect to the controller 40-(M+1)) can be considered an inner controller and the controller 40-(M+1) can be considered an outer controller with respect to the controller 40-M. The input 26 to controller 40-N can be provided by the pilot/operator and output signal of controller 40-1 can be used as input signal to physical actuators 34 which then can cause movement of one or more flight control surfaces 20 and/or change in engine thrust.

Figure 4:
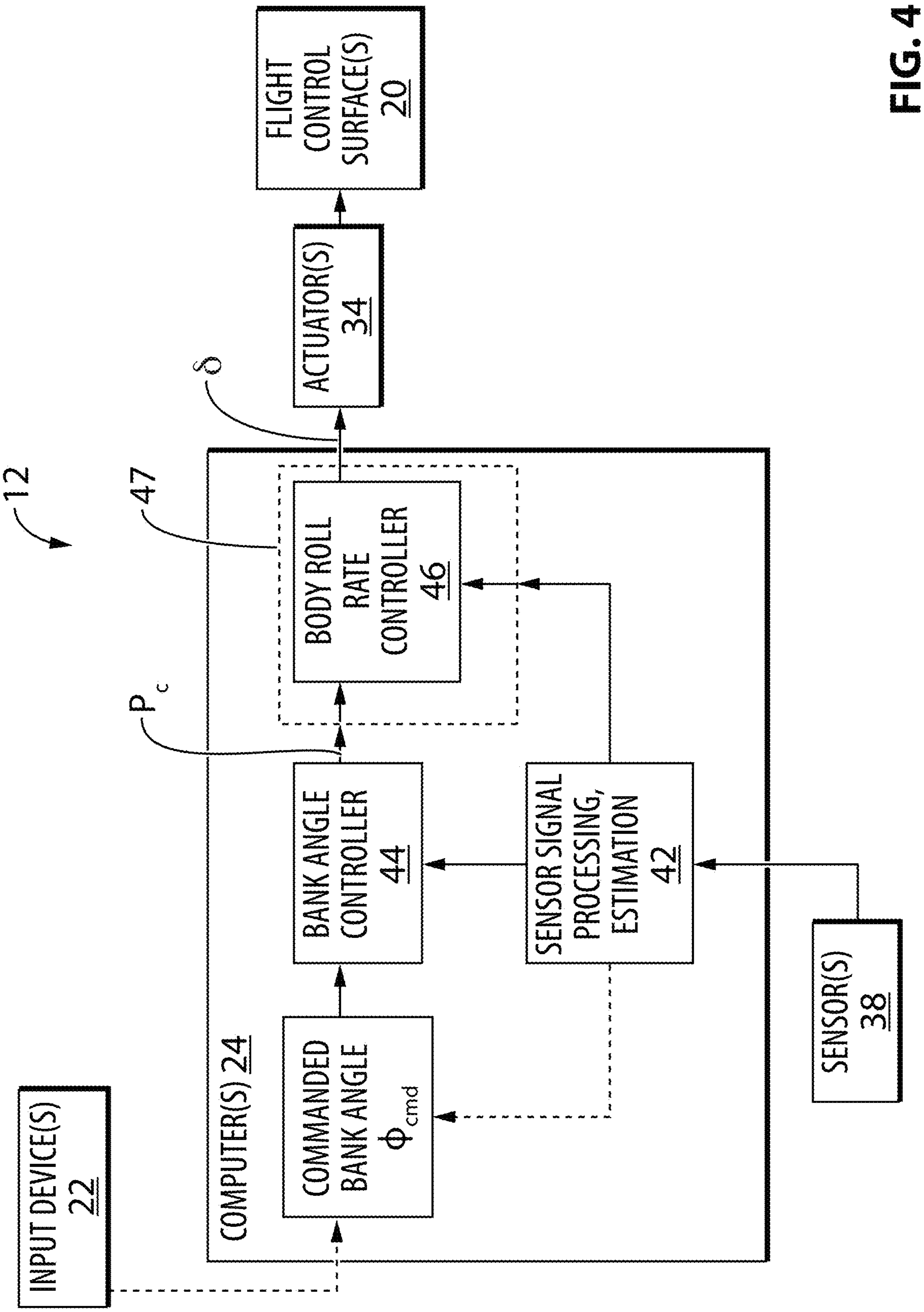
FIG. 4 is a schematic representation of an exemplary bank angle controller of the control system of FIG. 2.

FIG. 4 shows a schematic representation of an exemplary control system for controlling bank angle $\phi$ of aircraft 10, where bank angle controller 44 defines an outer control loop which receives commanded bank angle $\phi_{cmd}$ from a pilot or operator input device 22 or from another source (e.g. a heading angle controller). The bank angle controller 44 can generate a target body roll rate $P_c$ which can then be provided as input to body roll rate controller 46. Both the bank angle controller 44 and the body roll rate controller 46 can receive state information from the sensor signal processing and estimation block 42 which can receive input from one or more sensors 38. The body roll rate controller 46 can then generate target deflections $\delta$ for control surface(s) 20. Actuators 34 can then cause deflection of flight control surface(s) 20. The bank angle controller 44 and body roll rate controller 46 can be part of a larger system comprising one or more computers 24 which can be configured to receive signals from one or more sensors 38 and which can provide input to actuators 34.

Figure 5:
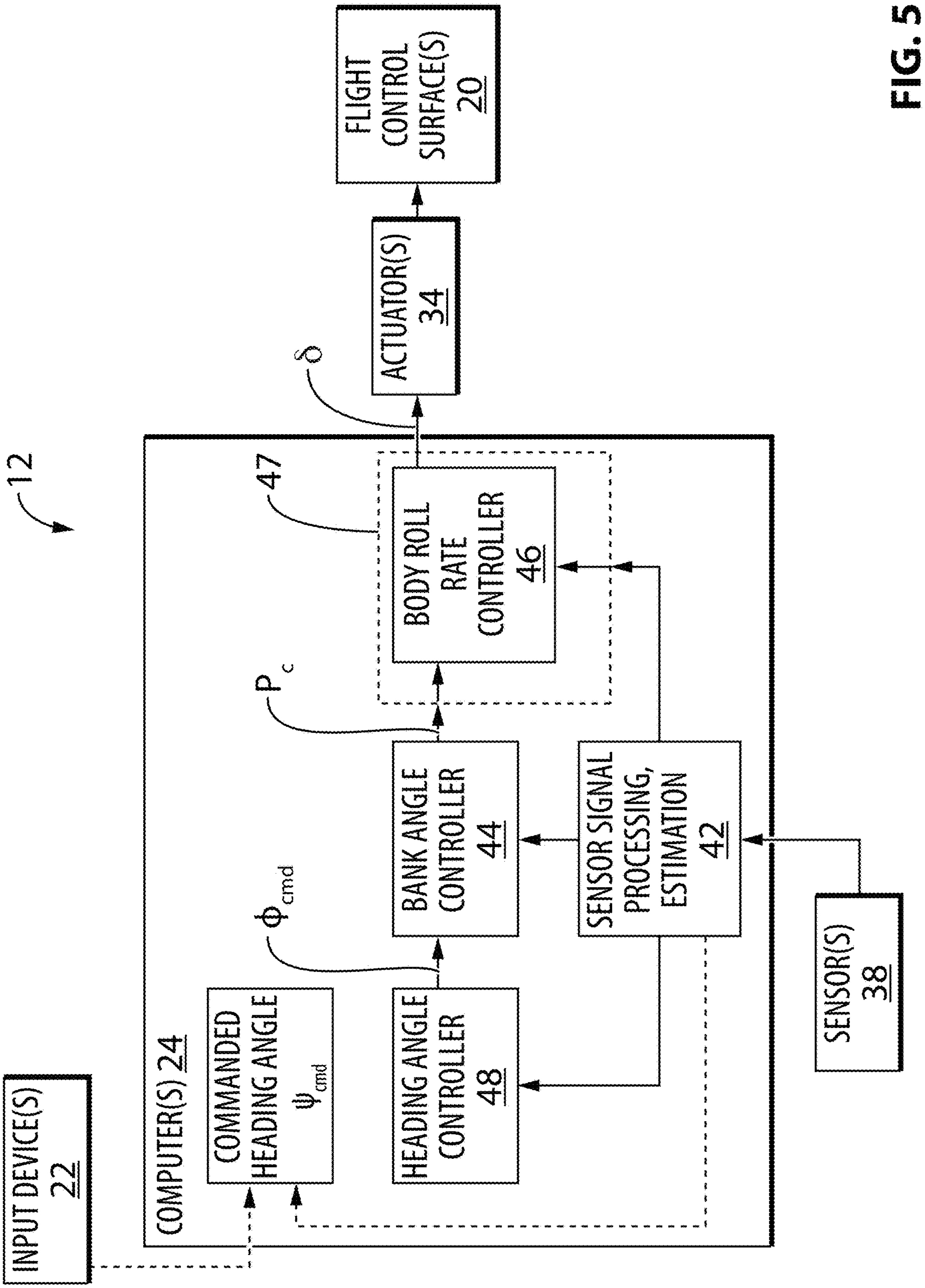
FIG. 5 is a schematic representation of an exemplary heading angle controller of the control system of FIG. 2.

FIG. 5 shows a schematic of an exemplary control system for controlling heading angle $\psi$ where a heading angle controller 48 defines an outer control loop which receives a commanded heading angle $\psi_{cmd}$ from a pilot/operator or from another source (e.g. a waypoint tracking controller). The heading angle controller 48 can generate commanded bank angle $\phi_{cmd}$ which can be provided as input to the bank angle controller 44, which can then generate a target body roll rate $P_c$ provided to the body roll rate controller 46. The heading angle controller 48, bank angle controller 44, and the body roll rate controller 46 can all receive state information from the sensor signal processing and estimation block 42 which can receive input from one or more sensors 38. The body roll rate controller 46 can generate target deflections $\delta$ for control surface(s) 20. Actuator 34 can then cause deflection of one or more flight control surface(s) 20. The heading angle controller 48, bank angle controller 44, and body roll rate controller 46 can be part of a larger system comprising one or more computers 24 which can be configured to receive signals from one or more sensors 38 and which can provide input to actuators 34.

Figure 6:
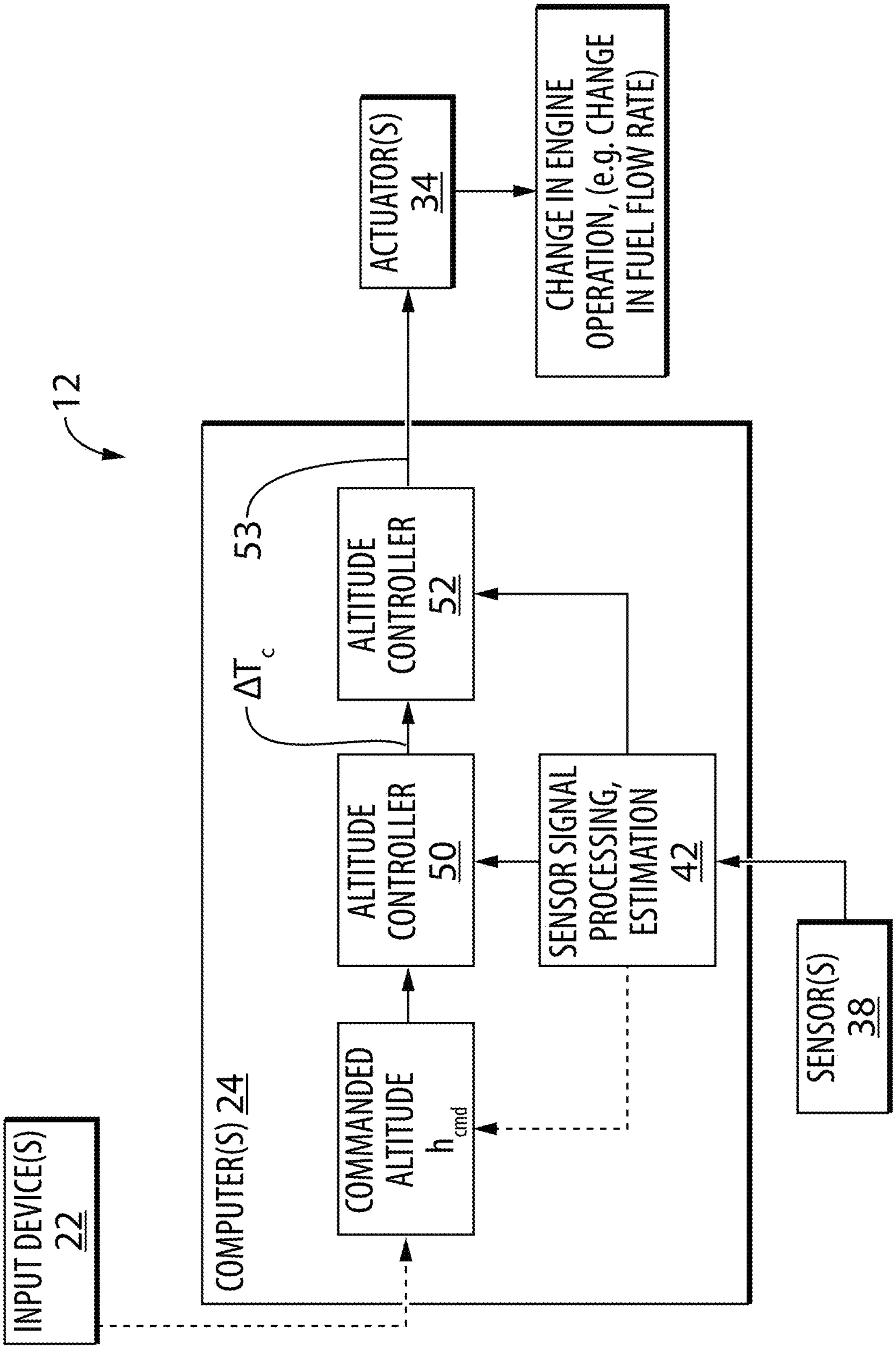
FIG. 6 is a schematic representation of an exemplary altitude controller of the control system of FIG. 2.

FIG. 6 shows a schematic of an exemplary control system for controlling altitude h of aircraft 10, where an altitude controller 50 defines an outer control loop which receives a commanded altitude $h_{cmd}$ from a pilot/operator or from another source. The altitude controller 50 can generate a target change in thrust force $\Delta T_c$ (e.g., target change in a thrust lever angle (TLA)) which can be provided as input to the thrust controller 52. Both the altitude controller 50 and the thrust controller 52 can receive state information from the sensor signal processing and estimation block 42 which can receive input from one or more sensors 38. The thrust controller 52 can generate target changes 53 to engine operation to achieve the target change in thrust force indicated by $\Delta T_c$, e.g. target changes to fuel supply to a combustor of a gas turbine engine 14 of aircraft 10. Actuators(s) 34 can carry out these target changes by adjusting (e.g., throttling) fuel flow to engine(s) 14 for example to cause the thrust force produced by engine(s) 14 to change. The altitude controller 50 and thrust controller 52 can be part of a larger system comprising one or more computers 24 which can be configured to receive signals from one or more sensors 38 and which can provide input to actuators 34.

Figure 7:
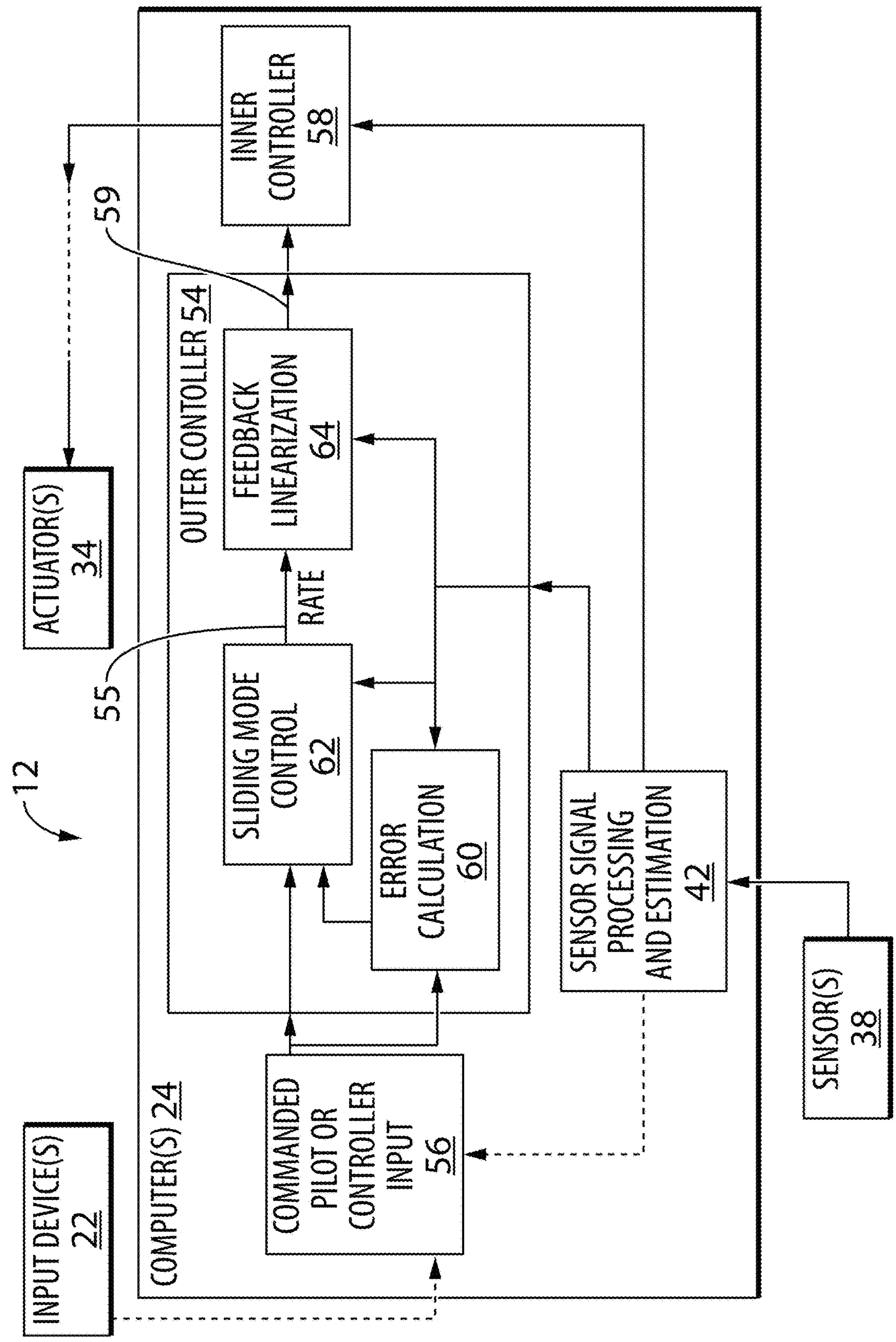
FIG. 7 is a schematic representation of an exemplary inner controller and associated outer controller of the control system of FIG. 2.

FIG. 7 shows a schematic of an exemplary control architecture including inner controller 58 and associated outer controller 54. The outer controller 54 can be a bank angle controller 44, heading angle controller 48 and/or altitude controller 50. The inner controller 58 can respectively be body roll rate controller 46, bank angle controller 44 and/or thrust controller 52. The outer controller 54 can receive one or more commands 56 such as the commanded bank angle $\phi_{cmd}$, the commanded heading angle $\psi_{cmd}$ and/or the commanded altitude $h_{cmd}$ from a pilot/operator or from another source, and an indication of the value of the corresponding state variables such as bank angle $\phi$, heading angle, altitude h from a sensor signal processing and/or estimation block 42 which can receive input from one or more sensors 38. In some embodiments, the outer controller 54 can receive either one of $\phi_{cmd}$ or $\psi_{cmd}$. The output of the sensor signal processing and estimation block 42 can be an input to an upstream controller providing the command and also to an error calculation block 60 within the outer controller 54.

The error calculation block 60 in the outer controller 54 can calculate the error as an indication of a difference between the applicable state variable and the associated command, and then provide the error to the sliding mode control (SMC) block 62. The SMC block 62 can receive the error and generate a target rate of change 55 for the state variable based on the error. The rate of change 55 can be an input to a feedback linearization (FL) block 64. The SMC block 62 and the FL block 64 together can form the nonlinear dynamic inversion control (NDIC). The FL block 64 can receive the target rate of change 55 and produce an input 59 (e.g., a target body roll rate $P_c$, commanded bank angle $\phi_{cmd}$ and/or target change in thrust force $\Delta T_c$) for the inner controller 58. The inner controller 58 can generate signals to be used to command other controllers operatively coupled to actuators 34 or to directly command actuators 34 in order to effect a physical change in the state of aircraft 10 during operation by causing deflection of one or more flight control surfaces 20 or increase in fuel supply to a combustor of a gas turbine engine for example. The outer controller 54 and inner controller 58 can be part of a larger system comprising one or more computers 24 which can be configured to receive signals from one or more sensors 38 and which can provide input to actuators 34.

Figure 8A:
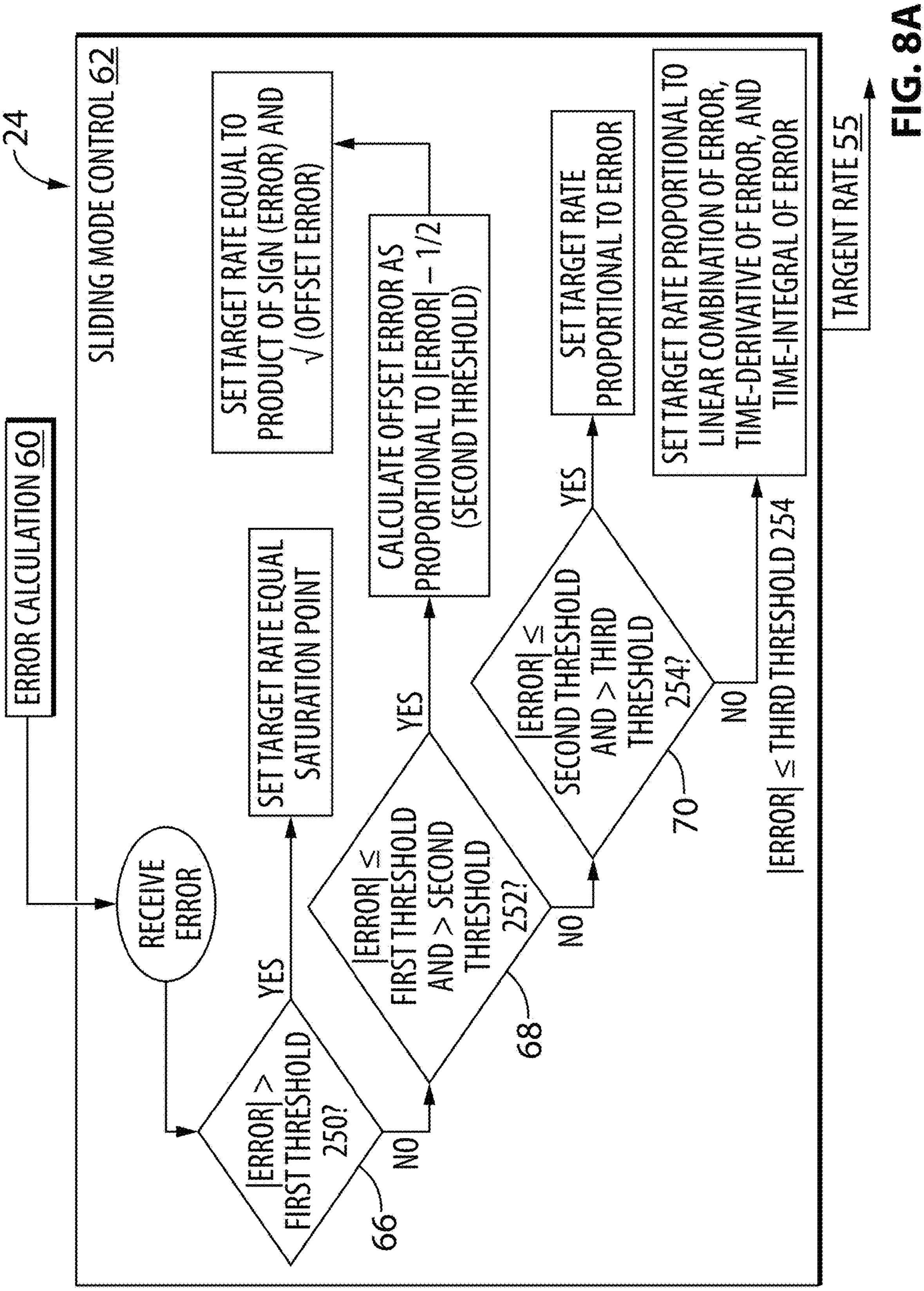
FIG. 8A is a schematic representation of an exemplary sliding mode controller of the control system of FIG. 2.

FIG. 8A shows a schematic of an exemplary SMC block 62. The SMC block 62 can receive an error from the error calculation block 60. The error can then be processed to obtain a target rate of change 55 for the applicable state variable (e.g., target rate of change $\dot{\phi}_{des}$ for the bank angle $\phi$ of aircraft 10, a target rate of change $\dot{\psi}_{des}$ for the heading angle $\psi$ of aircraft 10 and/or a target rate of change $\dot{h}_{des}$ for the altitude h of aircraft 10). In some embodiments, the error calculation block 60 can be included within the SMC block 62. In some embodiments, other components upstream or downstream of the SMC block 62 can also be included within the SMC block 62. The logical structure of the processing of the error is shown within the SMC block 62 in FIG. 8A. In some embodiments, the logical conditions of the logical structure can partially or wholly be implemented explicitly, e.g. by writing software code implementing conditional statements in a computer program. In some embodiments, the logical conditions of the logical structure can partially or wholly be realized implicitly, e.g. by using mechanical and electrical components which implement the logical structure in combination.

The error received by the SMC block 62 can be passed to the first condition 66 of the logical structure wherein if the absolute value of the error is greater than a first threshold 250, the target rate of change can be set equal to a saturation rate, and if not the error can be passed to the second condition 68 of the logical structure. The saturation rate may be user-defined. For example, the saturation rate may be chosen to prevent damage to or extend a service life of an aircraft component, system, or structure. In the second condition 68, if the absolute value of the error is less than or equal to a first threshold 250 and greater than a second threshold 252, the target rate of change can be set equal to the product of an offset error and a signum function of the error, where the signum function is equal to −1 when the error is negative, equal to +1 when the error is positive, and equal to 0 when the error is zero. The offset error can be set proportional to the difference between the absolute value of the error and one-half of the second threshold 252. If the second condition 68 is not satisfied, the error can be passed to the third condition 70, where if the absolute value of the error is less than or equal to a second threshold 252 and greater than a third threshold 254, the target rate of change can be set proportional to the error. If the third condition 70 is then not satisfied, i.e. the absolute value of the error satisfies none of the prior three conditions and is less than or equal to the third threshold 254, the target rate of change can be set equal to a Proportional-Integral-Derivative (PID) function, i.e. a linear combination of the error, derivative of the error with respect to time, and integral of the error with respect to time. In some embodiments, the first threshold 250, second threshold 252, third threshold 254, and one or more of the proportionality constants can be chosen such that the SMC control block 62 assigns a target rate for each value of error in a manner defining a continuous function mapping error to target rate. In some embodiments, the function mapping error to target rate can be differentiable, In some embodiments, the function can be differentiable whenever the error is less than the first threshold 250 and/or whenever error is greater than the first threshold 250.

Figure 8B:
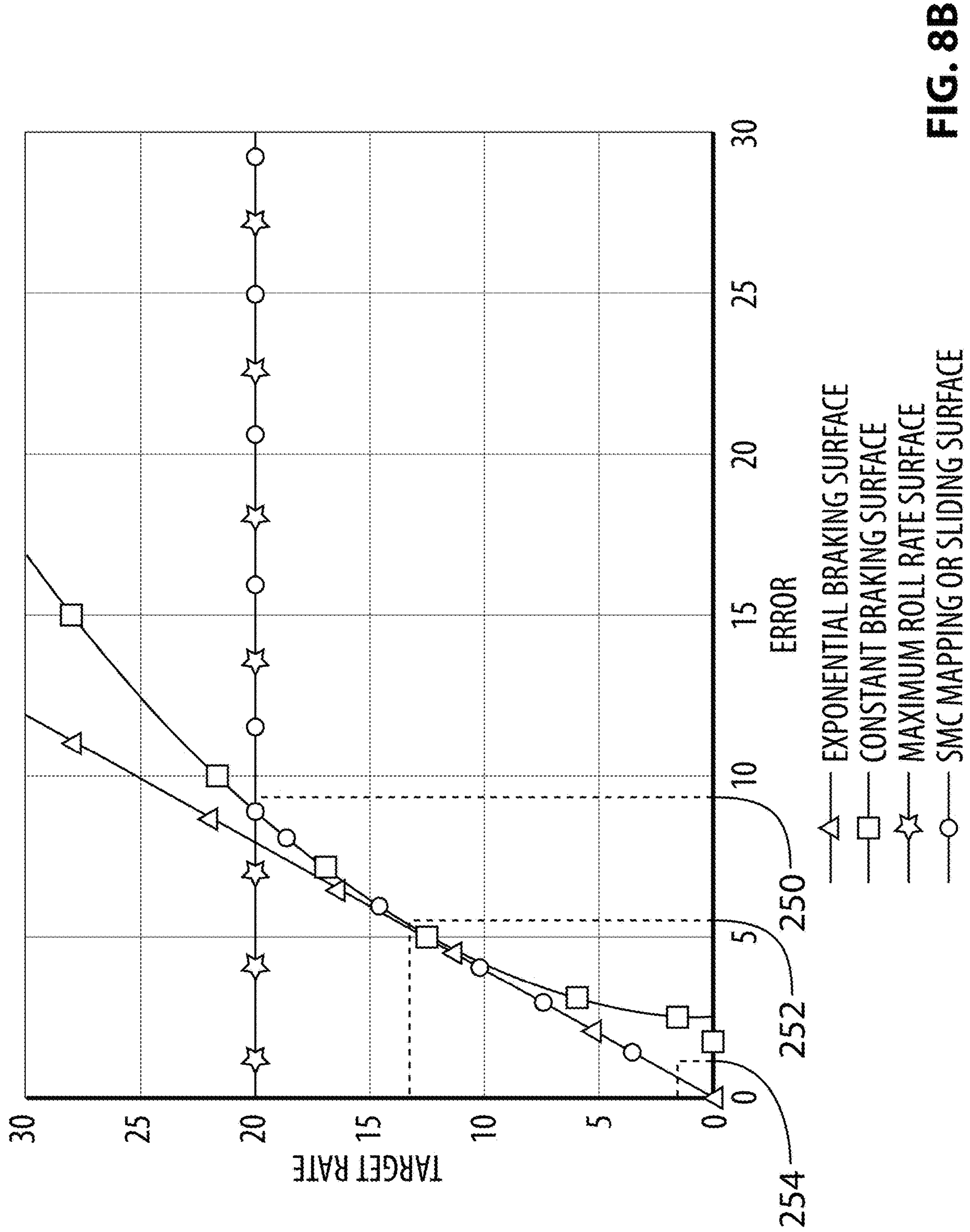
FIG. 8B is a plot of an exemplary sliding mode control mapping between an error and a target rate.

FIG. 8B is a plot of another exemplary SMC mapping between error and target rate (such as outlined in FIG. 8A), wherein the mapping is differentiable whenever error is less than the first threshold 250 and whenever error is greater than the first threshold 250, i.e. the mapping is not differentiable when the error is equal to the first threshold 250. Between the first threshold 250 and the second threshold 252, the SMC mapping may coincide with a constant braking surface, where the target rate may be equal to a rate arising from the work done by a constant torque or force. Between the second threshold 252 and third threshold 254, the SMC mapping may coincide with an exponential braking surface, wherein the target rate is proportional to the error.

Figure 8C:
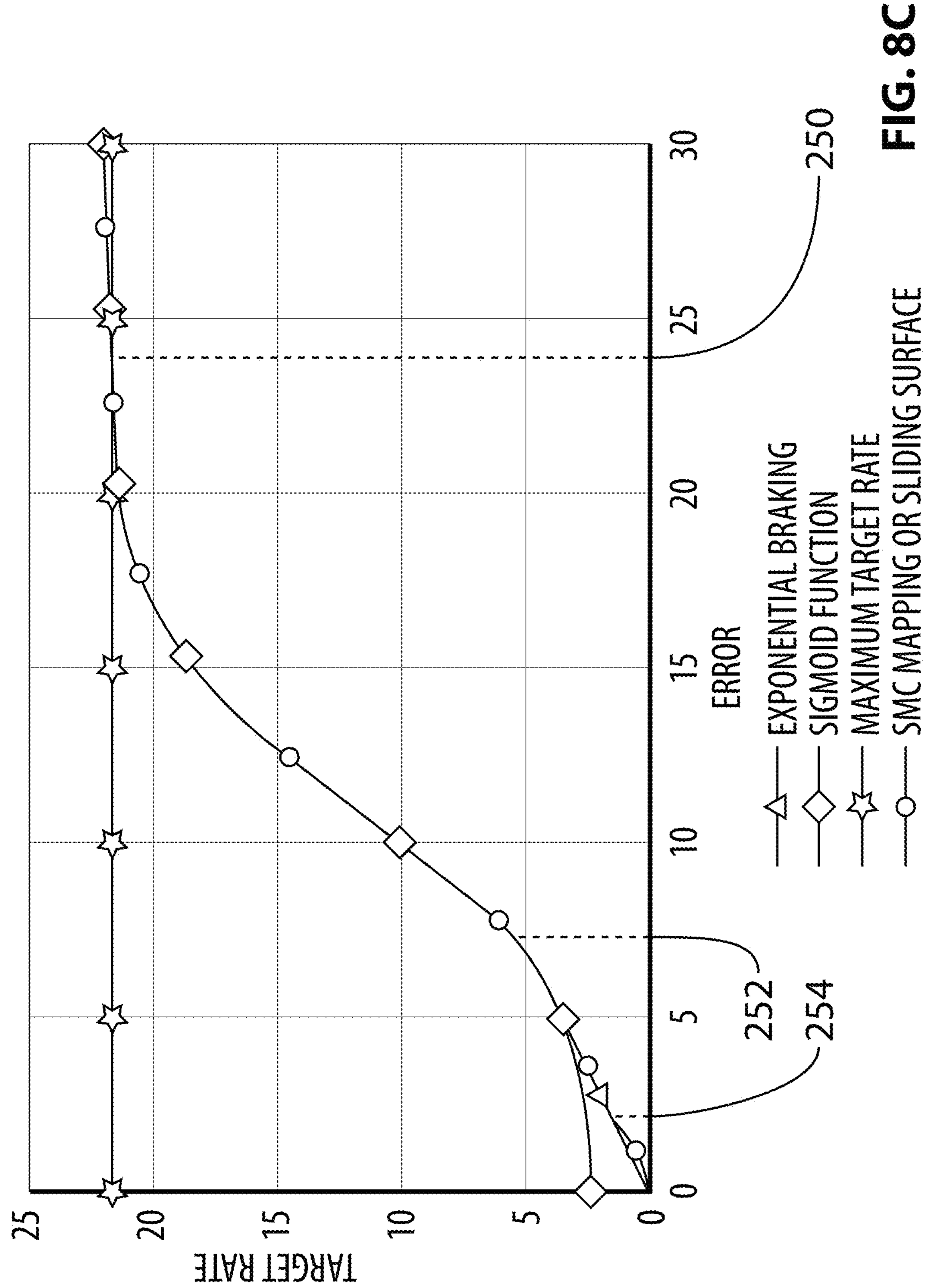
FIG. 8C is a plot of another exemplary sliding mode control mapping between an error and a target rate where the mapping utilizes a sigmoid function.

FIG. 8C is a plot of another exemplary SMC mapping between an error and a target rate. The SMC mapping of FIG. 8C utilizes a sigmoid function. In various embodiments, the sigmoid function may be a logistic function, a hyperbolic tangent function (tanh), an arctangent function, a Gauss error function (erf), or any other suitable sigmoid function. The SMC mapping may use the sigmoid function to replace a portion of the piecewise formulation described above. Since the sigmoid function may be approximately linear for small values of the argument and asymptotes to a maximum value as the argument of the function tends to infinity, e.g. the standard Gauss error function asymptotes to 1.00, at least a portion of the sigmoid function can be used to prescribe the target rate as a function of the error. In some embodiments, e.g. the embodiment illustrated in FIG. 8C, the exponential braking segment between the first threshold 250 and second threshold 252 may be prescribed using a sigmoid function. Varying the sigmoid function may be effective in adjusting the slope of the sigmoid near the second threshold 252 and therefore may enable greater freedom, while maintaining continuity or differentiability of the SMC mapping across the second threshold 252, in the selection of the slope of the exponential braking segment between the second threshold 252 and the third threshold 254.

In some embodiments, a portion of the exponential braking segment between the second threshold 252 and the third threshold 254, the constant braking segment in between the second threshold 252 and the first threshold 250, and the maximum target rate segment greater than the third threshold 250 may all be prescribed using a sigmoid function. Using the sigmoid function in such a manner ensures that the transition between the constant braking segment and the maximum target rate segments is smooth. The sigmoid function can be modified based on the maximum target rate and the three thresholds 250, 252, 254 to achieve the desired mapping. For example, the hyperbolic tangent function may be modified so that the mapping between target rate and error reads as follows: target rate=$a_1$+tanh ($a_2$error+$a_3$), where $a_1,a_2,a_3$ are constants depending on the maximum target rate and the three thresholds 250, 252, 254. Specifically, $a_1$ may be used to set the value of the maximum asymptote, $a_2$ may be used to set the rate at which the sigmoid function ramps up to the maximum asymptote, and $a_3$ may be used to set the cross-over from the sigmoid function to pure exponential braking. In some embodiments, the sigmoid function may form the entirety of the mapping such that there may be no other piecewise segments.

In other embodiments, a smooth function other than a sigmoid function can be used to define a mapping between the target rate and error such that the target rate at zero error vanishes. In some such embodiments, the target rate may be constrained to be below a saturation target rate.

For the bank angle controller 44, the SMC block 62, can receive bank angle error $\phi_{err}$ which can be an indication of the difference between the bank angle $\phi$ of aircraft 10 and the commanded bank angle $\phi_{cmd}$. In some embodiments, bank angle error $\phi_{err}=\phi_{cmd}-\hat{\phi}$, where $\hat{\phi}$ is an indication of the aircraft bank angle $\phi$ which can be a direct output of the sensor signal processing and estimation block 42 and as such can be obtained by direct measurement, indirect measurement, or by estimation. For example, $\hat{\phi}$ can be obtained by processing an output of a three-axis inertial measurement unit, or by using one or more derived relationships between bank angle $\phi$ and other known, (directly or indirectly) measured, or otherwise estimated state variables. The SMC block 62 can process bank angle error $\phi_{err}$ and output a target rate of change $\dot{\phi}_{des}$ of the bank angle $\phi$ of aircraft 10 which then can be fed into the FL block 64. In some embodiments, the SMC block 62 can implement the logical structure shown in FIG. 8A by testing the absolute value of $\phi_{err}$ against a series of conditions and accordingly assigning the value of the target rate of change $\dot{\phi}_{des}$ for the bank angle $\phi$ of aircraft 10 such that the resulting mapping between bank angle error $\phi_{err}$ and the target rate of change $\dot{\phi}_{des}$ can be continuous. In other embodiments the mapping can be differentiable such that a differentiable mapping between bank angle error $\phi_{err}$ and the target rate of change $\dot{\phi}_{des}$ implementing the logical structure in FIG. 8A can be expressed as the following if-else conditional statements:

If $|\phi_{err}| \le C_{\phi,3}$ then $$\dot{\phi}_{des} = PID(\phi_{err})$$

Else if $|\phi_{err}| \le C_{\phi,2}$ then $$\dot{\phi}_{des} = k_\phi \phi_{err}$$

Else if $|\phi_{err}| \le C_{\phi,1}$ then $$\dot{\phi}_{des} = \text{sign}(\phi_{err})\sqrt{2k_\phi^2 C_{\phi,2}\left(|\phi_{err}| - \frac{C_{\phi,2}}{2}\right)}$$

Else $\dot{\phi}_{des} = \dot{\phi}_{lim}$ wherein $\dot{\phi}_{lim}$ is a saturation angular rate for the bank angle, $k_\phi$ is a constant, $C_{\phi,1}$ is the first threshold, $C_{\phi,2}$ is the second threshold, $C_{\phi,3}$ is the third threshold, and the PID function $PID(\phi_{err})$ is a linear combination of the bank angle error $\phi_{err}$, a derivative of the bank angle error $\phi_{err}$ and an integral of the bank angle error $\phi_{err}$ expressed as $$\int_{t_0}^{t} \phi_{err}(t)dt,$$

wherein t is the present time and $t_0$<t can be some time chosen as part of the tuning of the PID function. The values of $\dot{\phi}_{lim}$, k, $C_{\phi,1}$, $C_{\phi,2}$, $C_{\phi,3}$, $t_0$, and the constants in the linear combination of $PID(\phi_{err})$ can be chosen to obtain the desired performance from the SMC block 62 and limit the maximum target rate of change $\dot{\phi}_{des}$ for the bank angle $\phi$ to a desired maximum target angular rate $\dot{\phi}_{lim}$. As described generically above in reference to FIG. 8C, in some embodiments, at least a portion of the mapping between $\dot{\phi}_{des}$ and $\dot{\phi}_{err}$ may be a sigmoid function.

For the heading angle controller, the SMC block 62 can receive heading angle error $\psi_{err}$ which is an indication of the difference between the heading angle $\psi$ of aircraft 10 and the commanded heading angle $\psi_{cmd}$. In some embodiments, heading angle error $\psi_{err}=\psi_{cmd}-\hat{\psi}$ where $\hat{\psi}$ is an indication of the aircraft heading angle $\psi$ which can be a direct output of the sensor signal processing and estimation block 42 and as such can be obtained by direct measurement, indirect measurement, or estimation. For example, $\hat{\psi}$ can be obtained by processing and combining the output of a three-axis inertial measurement unit and a magnetic field sensor, or by using one or more derived relationships between heading and other (directly or indirectly) measured, or otherwise estimated state variables. The SMC block 62 can process heading angle error $\psi_{err}$ and output a target rate of change $\dot{\psi}_{des}$ for the heading angle ($\psi$) of aircraft 10 which can be provided to the FL block 64. In some embodiments, the SMC block 62 can implement the logical structure shown in FIG. 8A by testing the absolute value of heading angle error $\psi_{err}$ against a series of conditions and accordingly assigning the value of the target rate of change $\dot{\psi}_{des}$ such that the resulting mapping between heading angle error $\psi_{err}$ and target rate of change $\dot{\psi}_{des}$ can be continuous. In other embodiments, the mapping can be differentiable, e.g. a differentiable mapping between heading angle error $\psi_{err}$ and target rate of change $\dot{\psi}_{des}$ implementing the logical structure in FIG. 8A can be expressed as the following if-else conditional statements:

If $|\psi_{err}| \le C_{\psi,3}$ then $$\dot{\psi}_{des} = \sqrt{\frac{\dot{\psi}_{lim}^2}{C_{\psi,2}(2C_{\psi,1} - C_{\psi,2})}}\, PID(\psi_{err})$$

Else if $|\psi_{err}| \le C_{\psi,2}$ then $$\dot{\psi}_{des} = \sqrt{\frac{\dot{\psi}_{lim}^2}{C_{\psi,2}(2C_{\psi,1} - C_{\psi,2})}}\, \psi_{err}$$

Else if $|\psi_{err}| \le C_{\psi,1}$ then $$\dot{\psi}_{des} = \text{sign}(\psi_{err})\sqrt{2\left(\frac{\dot{\psi}_{lim}^2}{2C_{\psi,1} - C_{\psi,2}}\right)\left(|\psi_{err}| - \frac{C_{\psi,2}}{2}\right)}$$

Else $\dot{\psi}_{des} = \dot{\psi}_{lim}$ wherein $\dot{\psi}_{lim}$ is the saturation angular rate, $C_{\psi,1}$ is the first threshold, $C_{\psi,2}$ is the second threshold, $C_{\psi,3}$ is the third threshold, and the PID function $PID(\psi_{err})$ is a linear combination of the heading angle error $\psi_{err}$, derivative of the heading angle error $\psi_{err}$, and an integral of the heading angle error $\psi_{err}$ expressed as $$\int_{t_0}^{t} \psi_{err}(t)dt,$$

wherein t is the present time and $t_0<t$ can be some time chosen as part of the tuning of the PID function. The saturation rate $\dot{\psi}_{lim}$ can be specified in terms of a maximum allowable bank angle $\phi_{max}$ such that $$\dot{\psi}_{lim} = \frac{g\tan\phi_{max}}{\hat{V}_T}$$

wherein $\hat{V}_T$ is an indication of true air speed obtained via measurement, estimation, or otherwise, and g is a value of gravitational acceleration estimated based on altitude and geographical location, approximated as the value of gravitational acceleration at the surface of earth, or otherwise determined. The proportional term (gain) in the linear combination of PID($\psi_{err}$) can be equal to 1. The constants in the linear combination of PID($\psi_{err}$) and values of $\phi_{max}$, $C_{\psi,1}$, $C_{\psi,2}$, $C_{\psi,3}$ and $t_0$ can be chosen to obtain the desired performance from the SMC block 62 and limit the bank angle $\phi$ to a prescribed maximum bank angle $\phi_{max}$. As described generically above in reference to FIG. 8C, in some embodiments, at least a portion of the mapping between $\dot{\psi}_{des}$ and $\psi_{err}$ may be a sigmoid function.

For the altitude controller 50, the SMC block 62 can receive altitude error $h_{err}$ which can be an indication of a difference between the altitude h of the aircraft 10 and the commanded altitude $h_{cmd}$. In some embodiments, altitude error $h_{err}=h_{cmd}-\hat{h}$ where $\hat{h}$ is an indication of the aircraft altitude h which can be a direct output of the sensor signal processing and estimation block 42 and as such can be obtained by direct measurement, indirect measurement, or estimation. For example, $\hat{h}$ can be obtained by processing and combining the output of a pressure altimeter, a Global Positioning System (GPS) receiver, and/or a radar, or by using one or more derived relationships between altitude h and other (directly or indirectly) measured, or otherwise estimated state variables. The SMC block 62 can process altitude error $h_{err}$ and output a target rate of change $\dot{h}_{des}$ of altitude h of aircraft 10 which can then be provided to the FL block 64. In some embodiments, the SMC block 62 can implement the logical structure shown in FIG. 8A by testing the absolute value of altitude error $h_{err}$ against a series of conditions and accordingly assigning the value of target rate of change $\dot{h}_{des}$ such that the resulting mapping between altitude error $h_{err}$ and target rate of change $\dot{h}_{des}$ can be continuous. In other embodiments, the mapping can be differentiable, e.g. a differentiable mapping between altitude error $h_{err}$ and target rate of change $\dot{h}_{des}$ implementing the logical structure in FIG. 8A can be expressed as the following if-else conditional statements:

If $|h_{err}| \le C_{h,3}$ then $$\dot{h}_{des} = \sqrt{\frac{\dot{h}_{lim}^2}{C_{h,2}(2C_{h,1} - C_{h,2})}}\,PID(h_{err})$$

Else if $|h_{err}| \le C_{h,2}$ then $$\dot{h}_{des} = \sqrt{\frac{\dot{h}_{lim}^2}{C_{h,2}(2C_{h,1} - C_{h,2})}}\,h_{err}$$

-continued

Else if $|h_{err}| \le C_{h,1}$ then $$\dot{h}_{des} = \text{sign}(h_{err})\sqrt{2\left(\frac{\dot{h}_{lim}^2}{2C_{h,1} - C_{h,2}}\right)\left(|h_{err}| - \frac{C_{h,2}}{2}\right)}$$

Else $\dot{h}_{des} = \dot{h}_{lim}$ wherein $\dot{h}_{lim}$ is a saturation vertical speed, $C_{h,1}$ is the first threshold, $C_{h,2}$ is the second threshold, $C_{h,3}$ is the third threshold, and the PID function PID($h_{err}$) is a linear combination of the altitude error $h_{err}$, derivative of the error $h_{err}$ and an integral of the altitude error $h_{err}$ expressed as $$\int_{t_0}^{t} h_{err}(t)dt,$$

where t is the present time and $t_0<t$ can be some time chosen as part of the tuning of the PID function. The saturation vertical speed $\dot{h}_{lim}$ can be specified in terms of a maximum allowable flight path angle (FPA) $\gamma_{max}$ as $\dot{h}_{lim}=\gamma_{max}\hat{V}_T$ wherein $\hat{V}_T$ is an indication of aircraft true air speed obtained via measurement, estimation, or otherwise. A proportional term in the linear combination of PID($h_{err}$) can be equal to 1. The constants in the linear combination of PID($h_{err}$) and the values of $\gamma_{max}$, $C_{h,1}$, $C_{h,2}$, $C_{h,3}$ and $t_0$ can be chosen to obtain the desired performance from the SMC block 62 and limit the maximum FPA to $\gamma_{max}$. As described generically above in reference to FIG. 8C, in some embodiments, at least a portion of the mapping between $\dot{h}_{des}$ and $h_{err}$ may be a sigmoid function.

Figure 9:
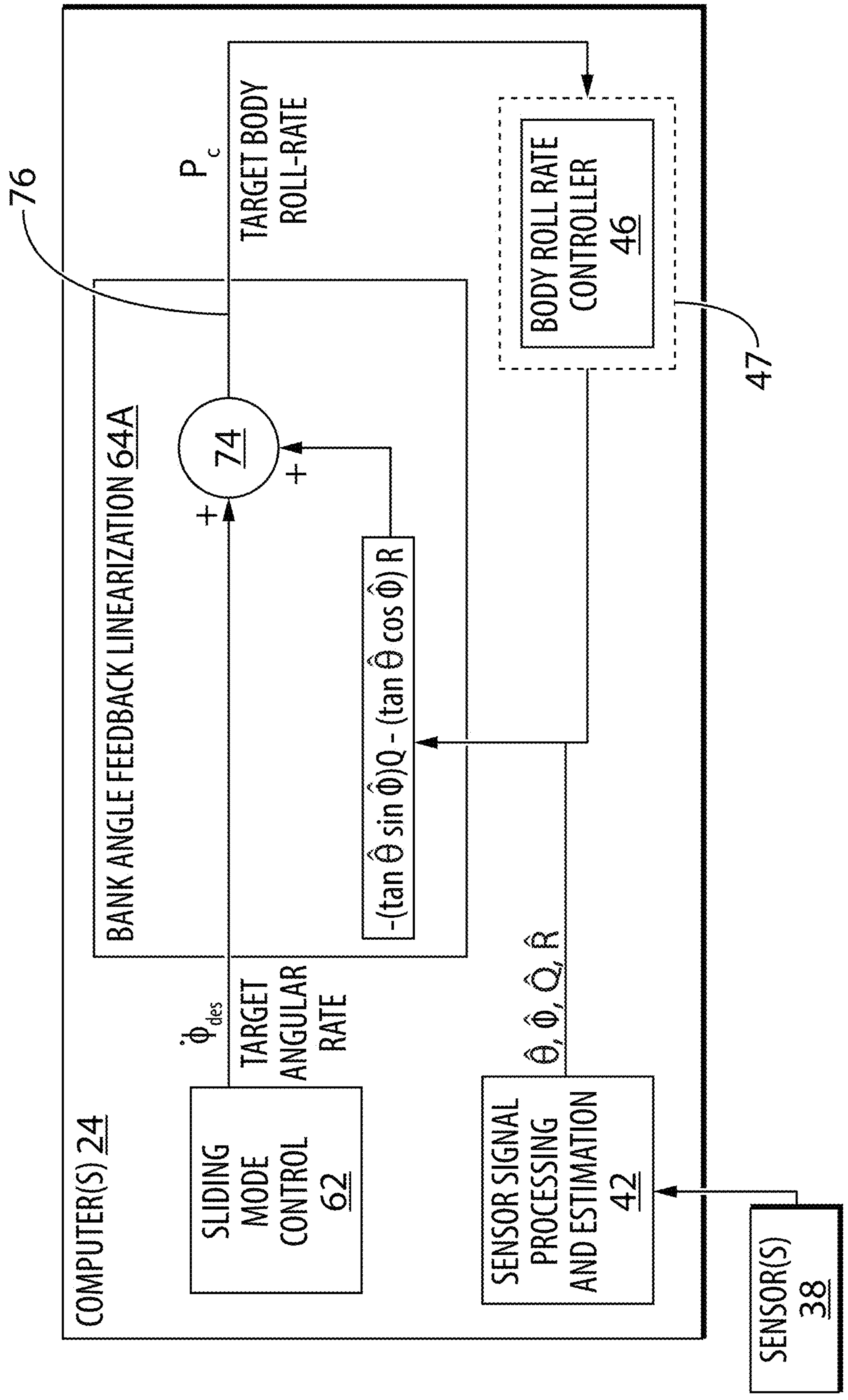
FIG. 9 is a schematic representation of an exemplary nonlinear dynamic inversion controller of the control system of FIG. 2 for controlling a bank angle of the aircraft.

FIG. 9 shows a schematic of an exemplary FL block 64A for controlling bank angle $\phi$ of an aircraft in flight. The FL block 64A can receive a target rate of change $\dot{\phi}_{des}$ for the bank angle $\phi$ from the SMC block 62 and can use input from sensor signal processing and estimation block 42 along with target rate of change $\dot{\phi}_{des}$ to generate target body roll rate $P_c$. As described previously, the relationship between bank angle rate $\dot{\phi}$ and body roll rate P can be expressed as $\dot{\phi}$=P+tan θ sin ϕ Q+tan θ cos ϕR.

In FL block 64A, an input can be provided which cancels a possibly nonlinear plant and simultaneously prescribes desired dynamics, i.e. a rate of the state variable. The body roll rate P can be considered an input to a plant where bank angle $\phi$ is a state variable. Setting the input P of this plant equal by to an FL input $P_c$ given $P_c=\dot{\phi}_{des}-\tan\hat{\theta}\sin\hat{\phi}\hat{Q}-\tan\hat{\theta}\cos\hat{\phi}\hat{R}$, may approximately cancel the nonlinear plant and force the bank angle rate $\dot{\phi}$ to follow the target rate of change $\dot{\phi}_{des}$. Values of $\hat{\theta}$, $\hat{\phi}$, $\hat{Q}$, $\hat{R}$ can be inputs from the sensor signal processing and estimation block 42 indicative of aircraft pitch angle, bank angle, body pitch rate, and body yaw rate, respectively. The FL block 64A can receive $\hat{\theta}$, $\hat{\phi}$, $\hat{Q}$, and $\hat{R}$ from the sensor signal processing and estimation block 42, compute $-\tan\hat{\theta}\sin\hat{\phi}\hat{Q}-\tan\hat{\theta}\cos\hat{\phi}\hat{R}$ and provide the result to summing junction 74 which can also receive an additional input of target rate of change $\dot{\phi}_{des}$ from the SMC block 62. The output 76 of summing junction 74 can provide the output of the FL block 64A. The output of the FL block 64A can then be provided to body roll rate controller 46 (shown in FIG. 4), which can then cause a deflection of control surface(s) 20. The body roll rate controller 46 may be part of a multiaxis controller 47 which may simultaneously allow control of body roll rate, body pitch rate, and body yaw rate.

Figure 10:
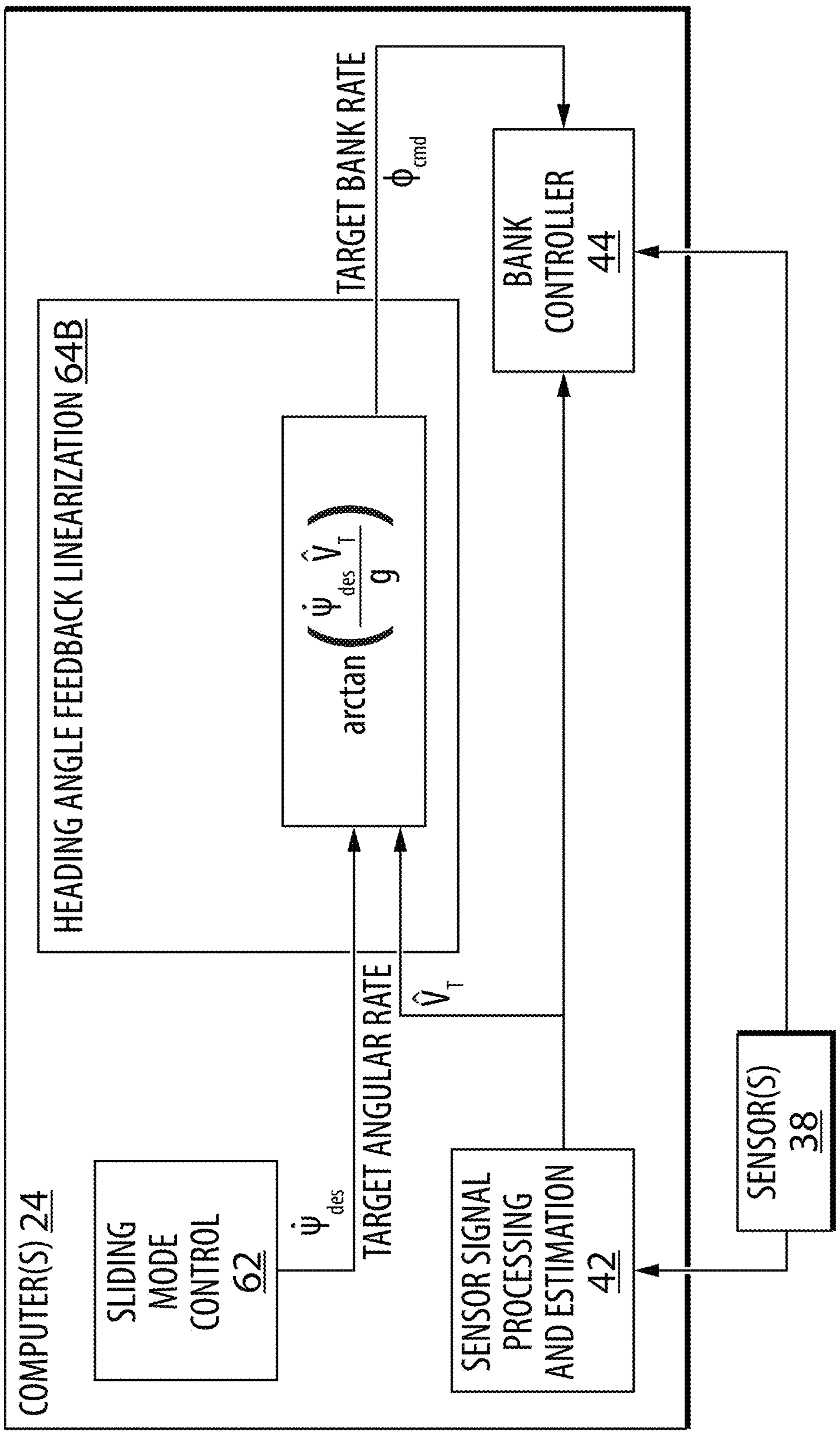
FIG. 10 is a schematic representation of an exemplary nonlinear dynamic inversion controller of the control system of FIG. 2 for controlling a heading angle of the aircraft.

FIG. 10 shows a schematic of an exemplary FL block 64B for controlling heading angle $\psi$ of an aircraft in flight. The FL block 64B can receive a target rate of change $\dot{\psi}_{des}$ for the heading angle $\psi$ of aircraft 10 from SMC block 62 and can use input from sensor signal processing and estimation block 42 along with target rate of change $\dot{\psi}_{des}$ to generate a commanded bank angle $\phi_{cmd}$. The relationship between heading angle rate $\dot{\psi}$ and bank angle $\phi$ for an aircraft performing a coordinated turn can be expressed as $$\dot{\psi} = \frac{g \tan\phi}{V_T}$$

wherein $V_T$ is true air speed and g is gravitational acceleration. As mentioned previously, in FL block 64B, an input can be provided which cancels a possibly nonlinear plant and simultaneously prescribes desired dynamics, i.e. a rate of the state variable. The bank angle $\phi$ can be considered an input to a plant where heading angle $\psi$ is a state variable. Setting the input bank angle $\phi$ of this plant equal to an FL input of the commanded bank angle $\phi_{cmd}$ given by the formula $$\phi_{cmd} = \arctan\left(\frac{\dot{\psi}_{des}\hat{V}_T}{g}\right),$$

can approximately cancel the nonlinear plant and force the heading angle rate $\dot{\psi}$ to follow the target rate of change $\dot{\psi}_{des}$. $\hat{V}_T$ can be an input from the sensor signal processing and estimation block 42 indicative of the aircraft true air speed. The FL block 64B can receive $\hat{V}_T$ from the sensor signal processing and estimation block 42, compute arctan $$\left(\frac{\dot{\psi}_{des}\hat{V}_T}{g}\right)$$

and provide the result as an output of the FL block 64B. The output of the FL block 64B can then be provided to bank angle controller 44 (shown in FIG. 5), which then can cause a deflection of control surface(s) 20. Accordingly, the bank angle controller 44 can be an inner controller to the heading angle controller 48 (see FIG. 5).

Figure 11:
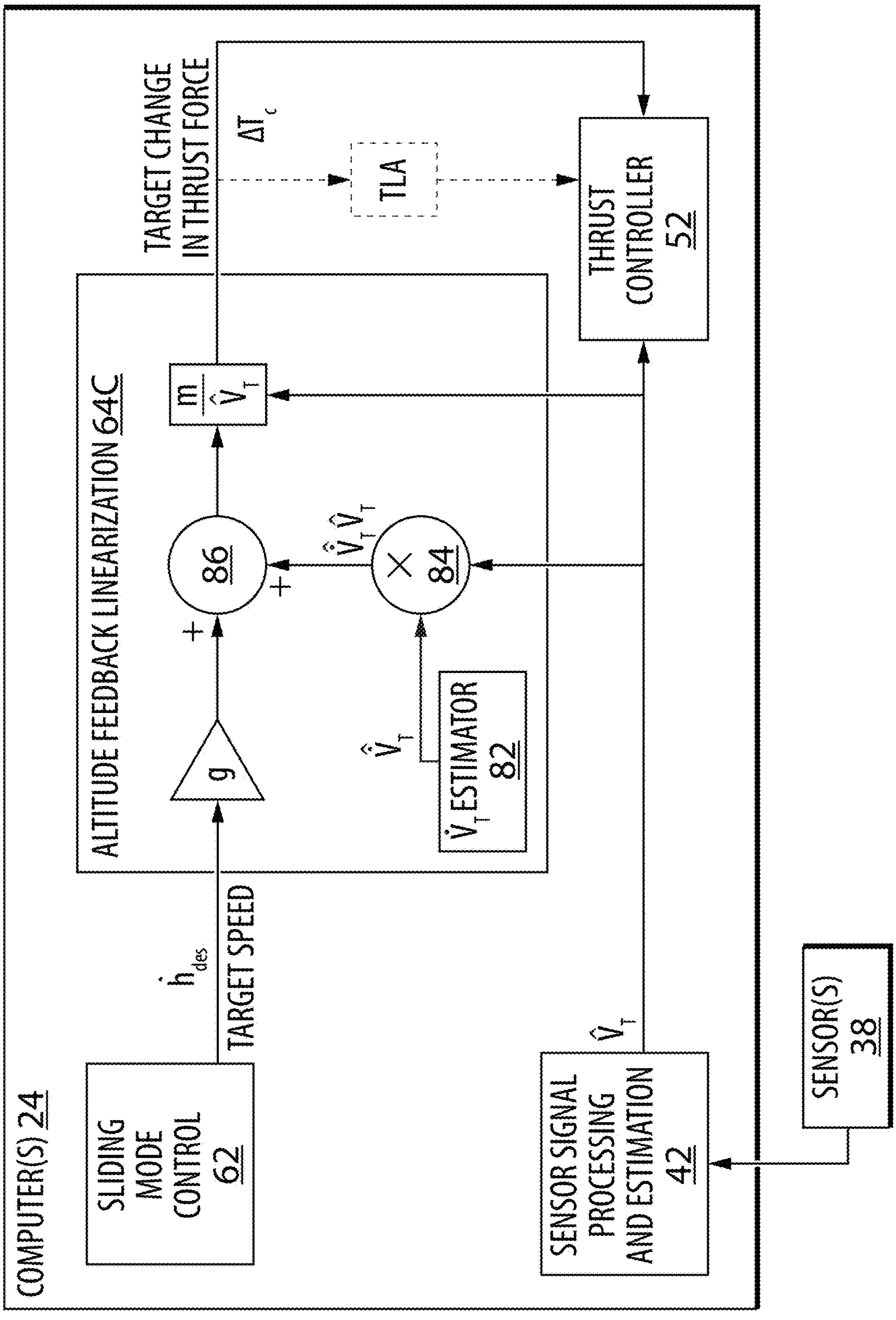
FIG. 11 is a schematic representation of an exemplary nonlinear dynamic inversion controller of the control system of FIG. 2 for controlling an altitude of the aircraft.

FIG. 11 shows a schematic of an exemplary FL block 64C for controlling altitude h of an aircraft in flight. The FL block 64C can receive a target rate of change $\dot{h}_{des}$ of altitude h from the SMC block 62 and can use input from sensor signal processing and estimation block 42 along with target rate of change $\dot{h}_{des}$ to generate a target change in thrust force $\Delta T_c$. The relationship between altitude rate $\dot{h}$ and $\Delta T$ for an aircraft flying in trim condition (with a trim thrust force $T_{trim}$) can be deduced from an energy equation as $$\dot{h} = \frac{1}{g}\left(-V_T\dot{V}_T + \frac{1}{m}V_T\Delta T\right)$$

where $V_T$ is true air speed, g is gravitational acceleration, and m is mass of aircraft 10. As mentioned previously, in FL block 64C, an input can be provided which cancels a possibly nonlinear plant and simultaneously prescribes desired dynamics, i.e. a rate of the state variable. The target change in thrust force $\Delta T$ can be considered an input to a plant where altitude h is a state variable. Setting the input $\Delta T$ of this plant equal to an FL input $\Delta T_c$ given by $$\Delta T_c = \frac{m}{\hat{V}_T}\left(g\dot{h}_{des} + \hat{V}_T\hat{\dot{V}}_T\right),$$

can approximately cancel the nonlinear plant and force the altitude rate $\dot{h}$ to follow the target rate of change $\dot{h}_{des}$ where $\hat{V}_T$ can be an input from the sensor signal processing and estimation block 42 indicative of the aircraft true air speed and $\hat{\dot{V}}_T$ can be an indication of true air acceleration. The FL block 64C can receive $\hat{V}_T$ from the sensor signal processing and estimation block 42 and input $\hat{V}_T$ to a product junction 84. The product junction 84 can also receive an input from a $\dot{V}_T$ (true air acceleration) estimator 82, this input can be an indication $\hat{\dot{V}}_T$ of true air acceleration. In various embodiments the $\dot{V}_T$ (true air acceleration) estimator 82 can obtain $\hat{\dot{V}}_T$ by directly numerically differentiating $\hat{V}_T$, by an estimation technique using one or more known relationships between air acceleration and other measured or otherwise estimated quantities provided by the sensor signal processing and estimation block 42, by filtering $\hat{V}_T$ and then numerically differentiating the result, or by any other suitable method apparent to one skilled in the art. The output of the product junction can be $\hat{V}_T\hat{\dot{V}}_T$, an indication of rate of change of kinetic energy per unit mass of the aircraft 10. This output can be input to a summing junction 86, which can have an additional input obtained from passing target rate of change $\dot{h}_{des}$ through a gain with value g. The output of the summing junction 86 can be multiplied by $$\frac{m}{\hat{V}_T}$$

and the result can be the output of the FL block 64C. The output of the FL block 64C can then be provided to thrust controller 52 (see FIG. 6), which can then ultimately cause a change in engine operating condition, e.g. a change in amount of fuel supplied to a combustor in a gas turbine engine. The thrust controller 52 can receive state information from the sensor signal processing and estimation unit 42. For example, the thrust controller 52 may receive a trim condition thrust force T trim. In some embodiments, the altitude controller 50 may calculate a TLA value based on the target change in thrust force $\Delta T_c$ and feed the TLA value to the thrust controller 52.

Figure 12:
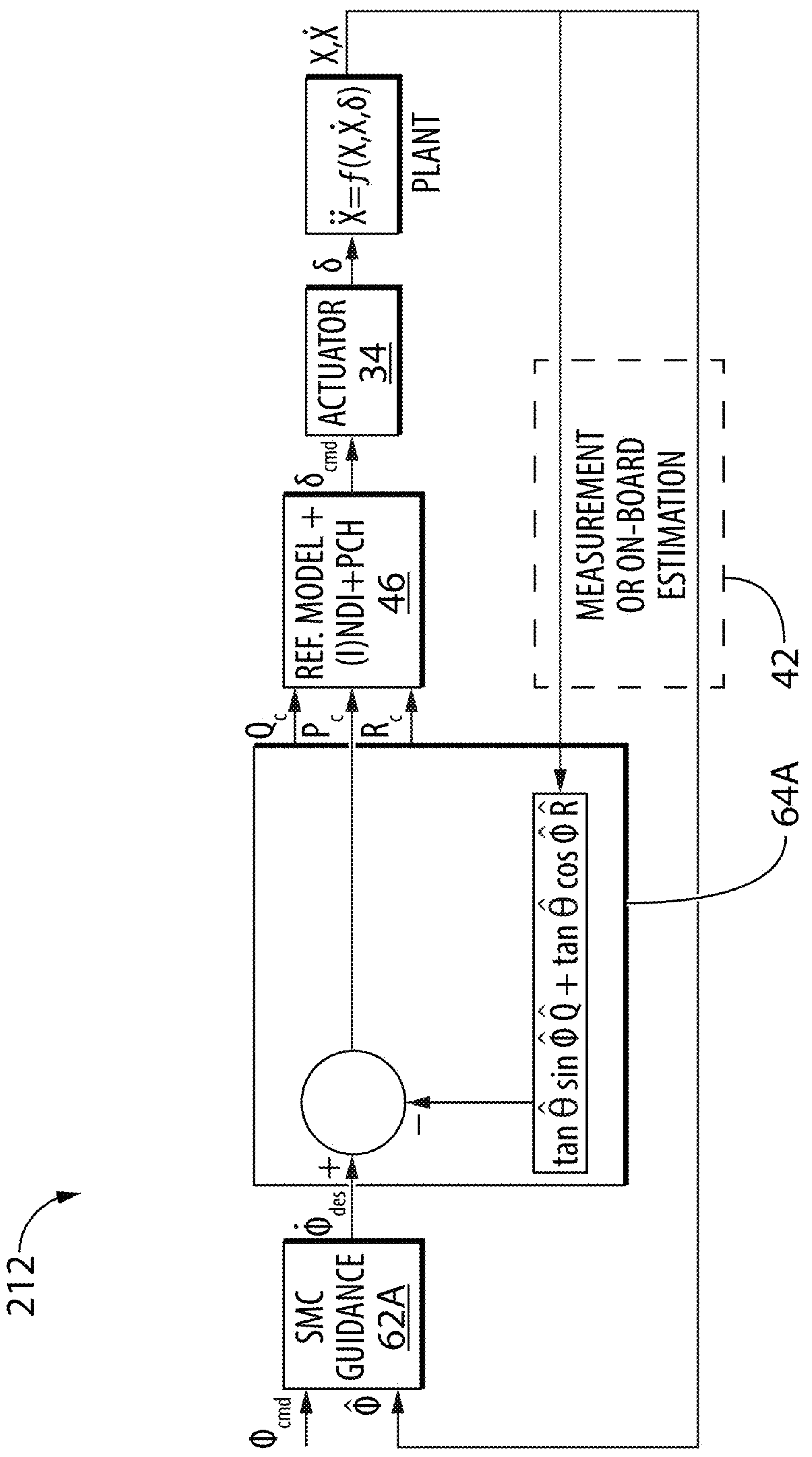
FIG. 12 is another schematic representation of an exemplary bank angle controller of the control system of FIG. 2.

FIG. 12 shows a schematic representation of an exemplary bank angle control system 212. System 212 can have elements previously described above in relation to other systems so like elements are identified using like reference numerals. The bank angle SMC block 62A can generate the target rate of change $\dot{\phi}_{des}$ of bank angle $\phi$ and provide $\dot{\phi}_{des}$ to bank angle FL block 64A implementing the formula $P_c=\dot{\phi}_{des}-\tan\hat{\theta}\sin\hat{\phi}\hat{Q}-\tan\hat{\theta}\cos\hat{\phi}\hat{R}$. The FL block 64A can generate a target body roll rate $P_c$ which can then be input into the body roll rate controller 46. The body roll rate controller 46 can generate one or more commands $\delta_{cmd}$ for causing desired deflection(s) of flight control surface(s) 20 via actuator(s) 34. The SMC block 62A and FL block 64A can both receive input from the sensor signal processing and estimation block 42. Body roll rate controller 46 can include an aerodynamic model of aircraft 10. Body roll rate controller 46 can make use of a nonlinear dynamic inversion control technique and/or an incremental nonlinear dynamics inversion (INDI). INDI, sometimes called "improved nonlinear dynamic inversion" or "modified nonlinear dynamic inversion" is a control technique based on calculating the required incremental change in control input to steer the aircraft toward the desired state. INDI is based on the assumption that for small increments of time, a system's response to control inputs is larger than its response to changing states. This assumption allows the increment in control input to be calculated from the system's input-dependent dynamics only and disregarding the system's state-dependent dynamics. Body roll rate controller 46 can also be augmented with pseudo-control hedging (PCH) which can reduce the magnitude of a commanded signal to a level achievable by a saturated controller. State variables $\hat{X}$, $\hat{\dot{X}}$ can be pseudo measurements.

Figure 13:
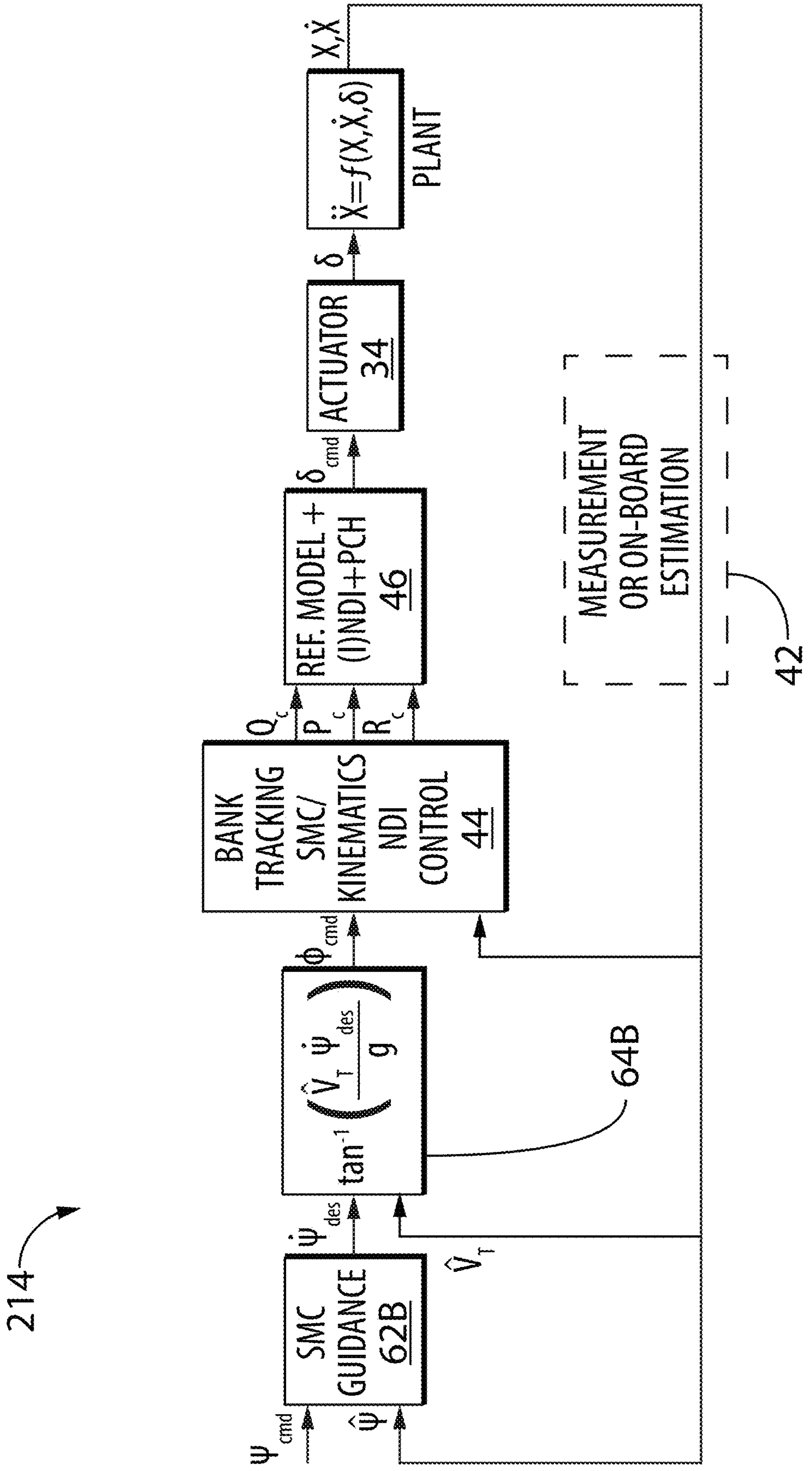
FIG. 13 is another schematic representation of an exemplary heading angle controller of the control system of FIG. 2.

FIG. 13 shows a schematic representation of an exemplary heading angle control system 214. System 214 can have elements previously described above in relation to other systems so like elements are identified using like reference numerals. The heading angle SMC block 62B can generate the target rate of change $\dot{\psi}_{des}$ of heading angle ($\psi$) and provide it to the heading angle FL block 64B implementing the formula $$\phi_{cmd} = \arctan\left(\frac{\dot{\psi}_{des}\hat{V}_T}{g}\right).$$

The FL block 64B can generate a commanded bank angle $\phi_{cmd}$, which can then be input into bank angle controller 44. The bank angle controller 44 can generate a target body roll rate $P_c$, which can then be input to the body roll rate controller 46. The body roll rate controller 46 generates one or more commands $\delta_{cmd}$ for causing desired deflection(s) of flight control surface(s) 20 via actuator(s) 34. The SMC block 62B and FL block 64B can both receive input from the sensor signal processing and estimation block 42.

Figure 14:
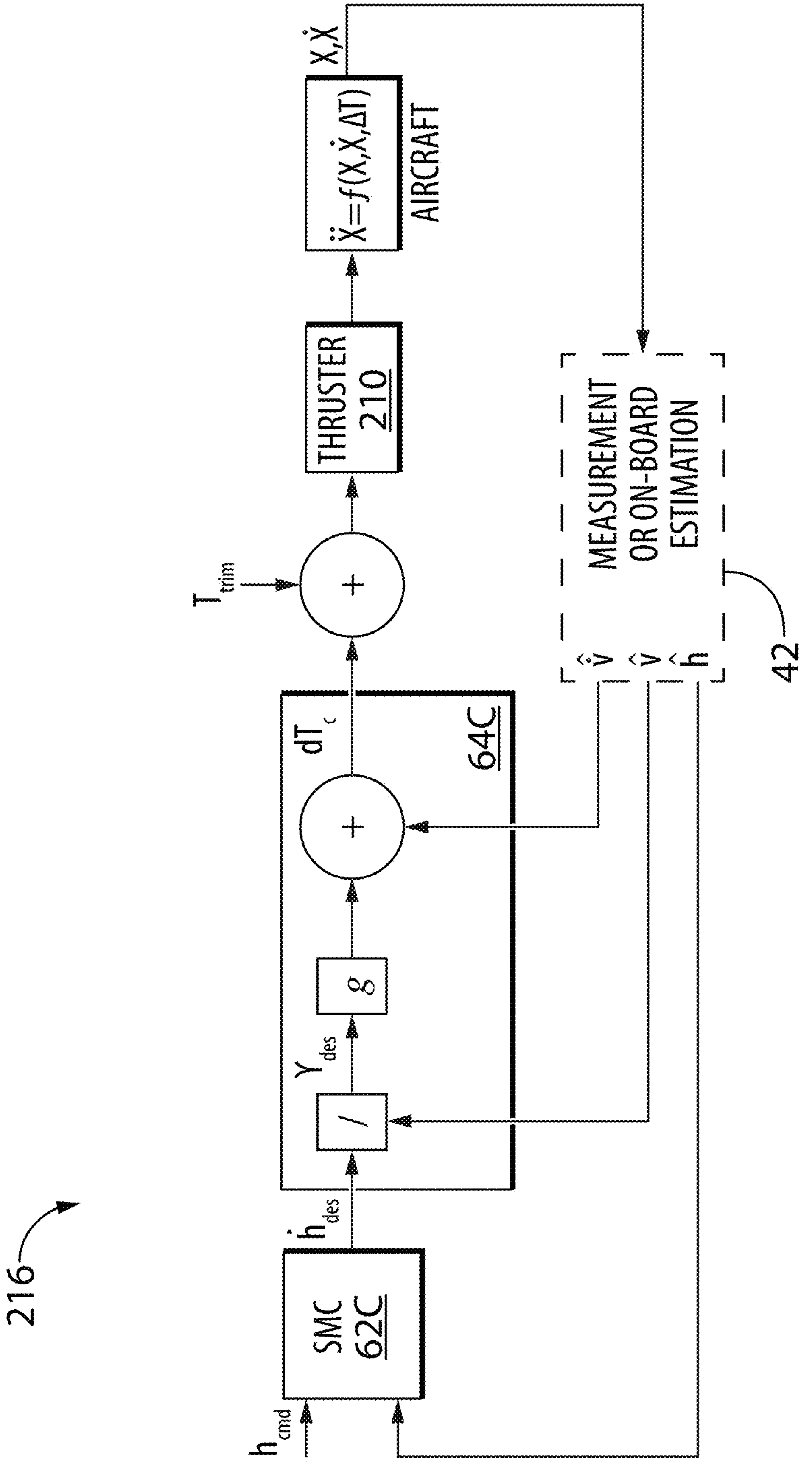
FIG. 14 is another schematic representation of an exemplary altitude controller of the control system of FIG. 2.

FIG. 14 shows a schematic representation of an exemplary altitude control system 216. System 216 can have elements previously described above in relation to other systems so like elements are identified using like reference numerals. The altitude SMC block 62C can generate the target rate of change $\dot{h}_{des}$ of altitude h and provide $\dot{h}_{des}$ to the altitude FL block 64C implementing the formula $$\Delta T_c = \frac{m}{\hat{V}_T}\left(g\dot{h}_{des} + \hat{V}_T\hat{\dot{V}}_T\right).$$

The FL block 64C can generate a command d $T_c$, which is a target change in thrust force. The command $dT_c$ is then added to the trim condition thrust force $T_{trim}$ and the resulting total thrust force is provided to the thruster 210. The thruster 210 can change the engine settings to change thrust. The SMC block 62C and FL block 64C can both receive input from the sensor signal processing and estimation block 42.

Figure 15:
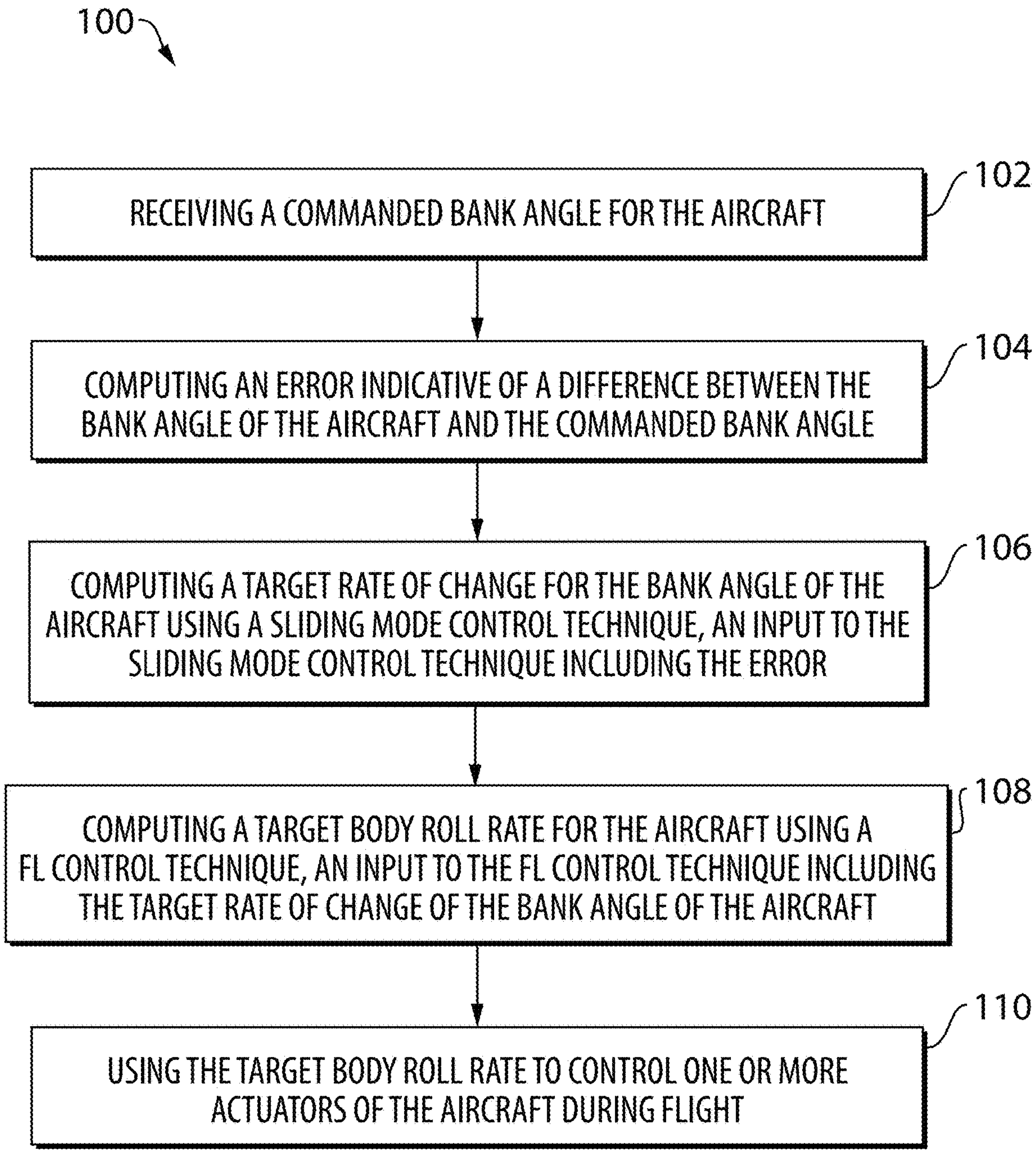
FIG. 15 is a flowchart illustrating an exemplary method for controlling a bank angle of an aircraft during flight.

FIG. 15 is a flowchart illustrating a method 100 for controlling bank angle ¢ of an aircraft during flight. Method 100 can be performed using system 12 described herein or using other systems. For example, machine-readable instructions 32 (see FIG. 2) can be configured to cause computer(s) 24 to perform at least part of method 100. It is understood that aspects of method 100 can be combined with aspects of other methods described herein. In various embodiments, method 100 can comprise:

receiving a commanded bank angle $\phi_{cmd}$ for aircraft 10 (see block 102);

computing a bank angle error $\phi_{err}$ indicative of a difference between the bank angle $\phi$ of aircraft 10 and the commanded bank angle $\phi_{cmd}$ (see block 104);

computing a target rate of change $\dot{\phi}_{des}$ for the bank angle $\phi$ of aircraft 10 using a sliding mode control technique, an input to the sliding mode control technique including the bank angle error $\phi_{err}$ (see block 106);

computing a target body roll rate $P_c$ for aircraft 10 using a FL control technique, an input to the FL control technique including the target rate of change $\dot{\phi}_{des}$ for the bank angle $\phi$ of aircraft 10 (see block 108); and using the target body roll rate $P_c$ to control one or more actuators 34 of aircraft 10 during flight (see block 110).

The FL control technique can include using an inversion of a relationship between the bank angle $\phi$ of aircraft 10 and one or more body angular rates of aircraft 10 to calculate the target body roll rate $P_c$ for aircraft 10.

The FL control technique can include computing the target body roll rate $P_c$ using the following formula:

$$P_c = \dot{\phi}_{des} - \tan\hat{\theta}\sin\hat{\phi}\hat{Q} - \tan\hat{\theta}\tan\hat{\phi}\hat{R},$$

where $\hat{\theta}$ denotes a value indicative of a pitch angle of aircraft 10, $\hat{\phi}$ denotes a value indicative of the bank angle $\phi$ of aircraft 10, $\hat{Q}$ denotes a value indicative of a body pitch rate of aircraft 10, and $\hat{R}$ denotes a value indicative of a body yaw rate of aircraft 10.

The sliding mode control technique can include generating the target rate of change $\dot{\phi}_{des}$ of the bank angle $\phi$ as a function of the bank angle error $\phi_{err}$, a first threshold $C_{\phi,1}$, a second threshold $C_{\phi,2}$ and a third threshold $C_{\phi,3}$ such that the target rate of change odes of the bank angle $\phi$, when an absolute value of the bank angle error $\phi_{err}$ is greater than the first threshold $C_{\phi,1}$, is chosen to be substantially equal to a bank angle saturation rate $\dot{\phi}_{lim}$.

When the absolute value of the bank angle error $\phi_{err}$ is less than the first threshold $C_{\phi,1}$ and greater than the second threshold $C_{\phi,2}$, the target rate of change $\dot{\phi}_{des}$ of the bank angle $\phi$ can be computed using the following formula:

$$\dot{\phi}_{des} = \text{sign}(\phi_{err})\sqrt{2k_\phi^2 C_{\phi,2}\left(|\phi_{err}| - \frac{C_{\phi,2}}{2}\right)},$$

where sign($\phi_{err}$) is a signum function of the bank angle error $\phi_{err}$ and $k_\phi$ denotes a parameter (e.g., constant).

When the absolute value of the bank angle error $\phi_{err}$ is less than the third threshold $C_{\phi,3}$, the target rate of change $\dot{\phi}_{des}$ of the bank angle $\phi$ can be chosen to be based on a proportional-integral-derivative control function of the bank angle error $\phi_{err}$.

When the absolute value of the bank angle error $\phi_{err}$ is less than the second threshold $C_{\phi,2}$ and greater than the third threshold $C_{\phi,3}$, the target rate of change des of the bank angle $\phi$ can be chosen to be proportional to the bank angle error $\phi_{err}$.

When the absolute value of the bank angle error $\phi_{err}$ is less than the second threshold $C_{\phi,2}$ and greater than the third threshold $C_{\phi,3}$, the target rate of change $\dot{\phi}_{des}$ of the bank angle $\phi$ can be computed using the following formula: $\dot{\phi}_{des}=k_{\phi}\phi_{err}$.

Figure 16:
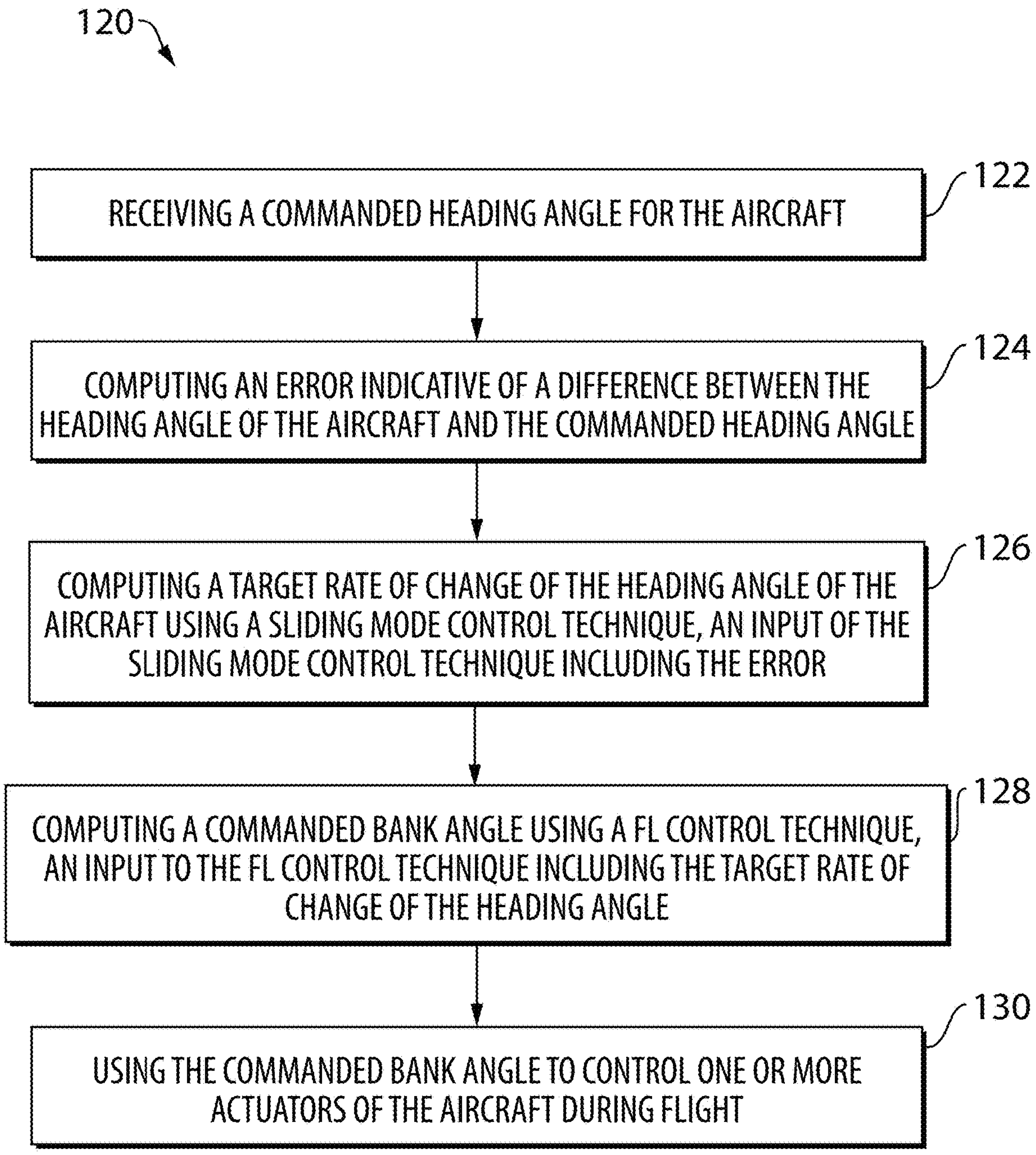
FIG. 16 is a flowchart illustrating an exemplary method for controlling a heading angle of an aircraft during flight.

FIG. 16 is a flowchart illustrating a method 120 for controlling heading angle $\psi$ of an aircraft during flight. Method 120 can be performed using system 12 described herein or using other systems. For example, machine-readable instructions 32 (see FIG. 2) can be configured to cause computer(s) 24 to perform at least part of method 120. It is understood that aspects of method 120 can be combined with aspects of other methods described herein. In various embodiments, method 120 can comprise:

- receiving a commanded heading angle $\psi_{cmd}$ for aircraft 10 (see block 122);
- computing an heading angle error $\psi_{err}$ indicative of a difference between the heading angle $\psi$ of the aircraft and the commanded heading angle $\psi_{cmd}$ (see block 124);
- computing a target rate of change $\dot{\psi}_{des}$ for the heading angle $\psi$ of aircraft 10 using a sliding mode control technique, an input of the sliding mode control technique including the heading angle error $\psi_{err}$ (see block 126);
- computing a commanded bank angle $\phi_{cmd}$ for aircraft 10 using a FL control technique, an input to the FL control technique including the target rate of change $\dot{\psi}_{des}$ for the heading angle $\psi$ of aircraft 10 (see block 128); and
- using the commanded bank angle $\phi_{cmd}$ to control one or more actuators 34 of the aircraft during flight (see block 130).

The FL control technique can include using an inversion of a relationship between the heading angle $\psi$ of aircraft 10 and a bank angle $\phi$ of aircraft 10 to calculate the commanded bank angle $\phi_{cmd}$.

The FL control technique can include computing the commanded bank angle $\phi_{cmd}$ using the following formula:

$$\phi_{cmd} = \arctan\left(\frac{\dot{\psi}_{des}\hat{V}_T}{g}\right),$$

where $\hat{V}_T$ is indicative of a true air speed of the aircraft, and g denotes gravitational acceleration.

The sliding mode control technique can include generating the target rate of change $\dot{\psi}_{des}$ of the heading angle $\psi$, as a function of the heading angle error $\psi_{err}$, a first threshold $C_{\psi,1}$, a second threshold $C_{\psi,2}$, and a third threshold $C_{\psi,3}$ such that the target rate of change $\dot{\psi}_{des}$ of the heading angle $\psi$, when an absolute value of the heading angle error $\psi_{err}$ is greater than the first threshold $C_{\psi,1}$, is chosen to be substantially equal to a heading angle saturation rate $\dot{\psi}_{lim}$.

When the absolute value of the heading angle error $\psi_{err}$ is less than the first threshold $C_{\psi,1}$ and greater than the second threshold $C_{\psi,2}$, the target rate of change $\dot{\psi}_{des}$ of the heading angle $\psi$ can be computed using the following formula:

$$\dot{\psi}_{des} = \text{sign}(\psi_{err})\sqrt{2\left(\frac{\dot{\psi}_{lim}^2}{2C_{\psi,1} - C_{\psi,2}}\right)\left(|\psi_{err}| - \frac{C_{\psi,2}}{2}\right)},$$

where $\text{sign}(\psi_{err})$ is a signum function of the heading angle error $\psi_{err}$.

When the absolute value of the heading angle error $\psi_{err}$ is less than the third threshold $C_{\psi,3}$, the target rate of change $\dot{\psi}_{des}$ of the heading angle $\psi$ can be chosen to be based on a proportional-integral-derivative control function of the heading angle error $\psi_{err}$.

When the absolute value of the heading angle error $\psi_{err}$ is less than the second threshold $C_{\psi,2}$ and greater than the third threshold $C_{\psi,3}$, the target rate of change $\dot{\psi}_{des}$ of the heading angle can be chosen to be substantially proportional to the heading angle error $\psi_{err}$.

When the absolute value of the heading angle error $\psi_{err}$ is less than the second threshold $C_{\psi,2}$ and greater than the third threshold $C_{\psi,3}$, the target rate of change $\dot{\psi}_{des}$ of the heading angle $\psi$ can be computed according to the following formula:

$$\dot{\psi}_{des} = \left(\sqrt{\frac{\dot{\psi}_{lim}^2}{C_{\psi,2}(2C_{\psi,1} - C_{\psi,2})}}\right)\psi_{err}.$$

When the absolute value of the heading angle error $\psi_{err}$ is less than the third threshold $C_{\psi,3}$, a proportional term in the proportional-integral-derivative control function can be substantially equal to $$\left(\sqrt{\frac{\dot{\psi}_{lim}^2}{C_{\psi,2}(2C_{\psi,1} - C_{\psi,2})}}\right).$$

In some embodiments methods 100 and 120 can be combined. For example, method 100 can be appended to method 120. Accordingly, the FL control technique of method 120 can be a first FL control technique; the sliding mode control technique of method 120 can be a first sliding mode control technique; and using the commanded bank angle $\phi_{cmd}$ to control the one or more actuators 34 of aircraft 10 during flight can comprise:

- computing bank angle error $\phi_{err}$ indicative of a difference between the bank angle ¢ of aircraft 10 and the commanded bank angle $\phi_{cmd}$;
- computing a target rate of change $\dot{\phi}_{des}$ for the bank angle $\phi$ of aircraft 10 using a second sliding mode control technique, an input to the second sliding mode control technique including the bank angle error $\phi_{err}$;
- computing a target body roll rate $P_c$ for aircraft 10 using a second FL control technique, an input to the second FL control technique including the target rate of change $\dot{\phi}_{des}$ for the bank angle $\phi$ of aircraft 10; and
- using the target body roll rate $P_c$ to control the one or more actuators 34 of aircraft 10 during flight.

Figure 17:
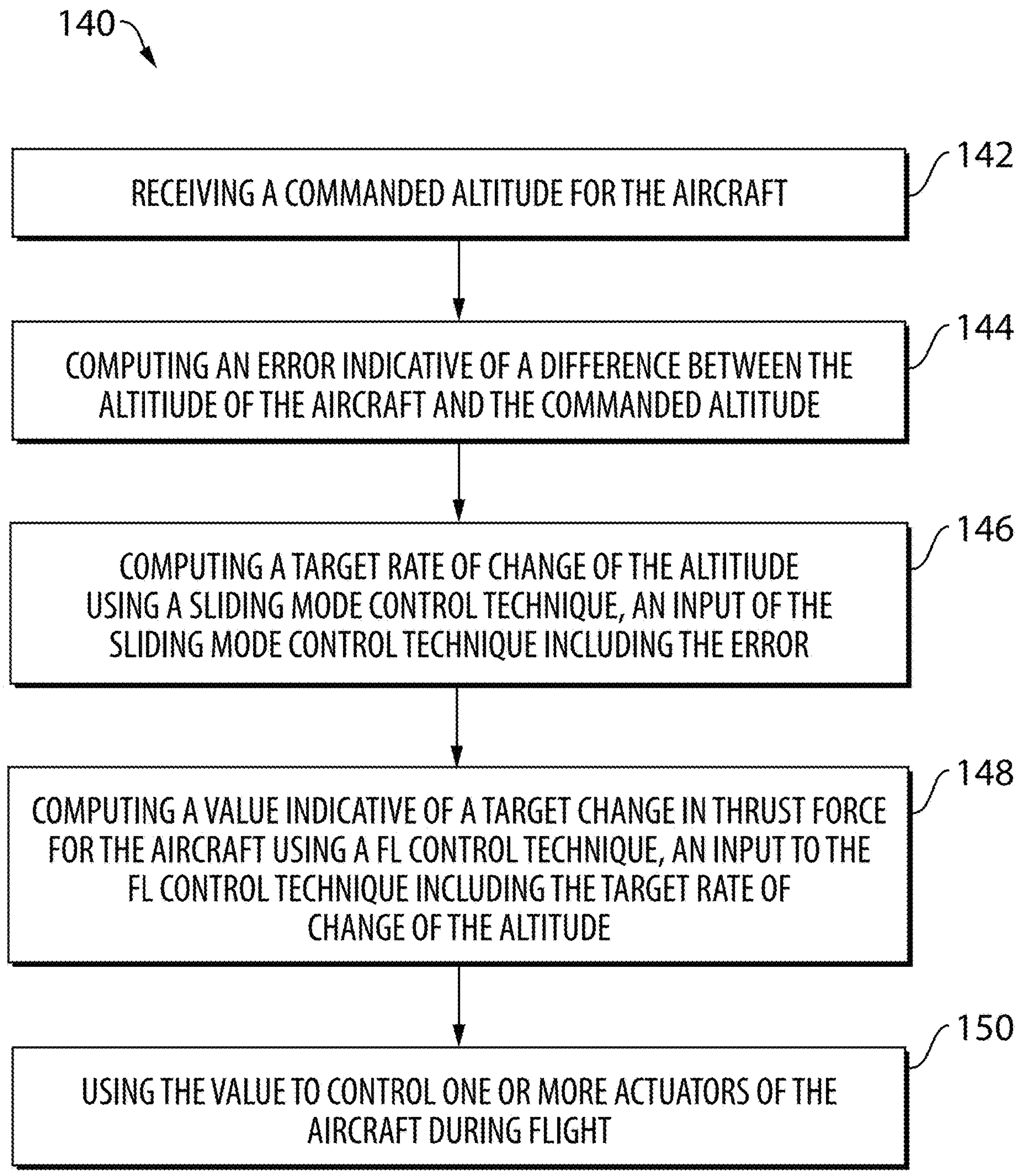
FIG. 17 is a flowchart illustrating an exemplary method for controlling an altitude of an aircraft during flight.

FIG. 17 is a flowchart illustrating a method 140 for controlling altitude h of an aircraft during flight. Method 140 can be performed using system 12 described herein or using other systems. For example, machine-readable instructions 32 (see FIG. 2) can be configured to cause computer(s) 24 to perform at least part of method 140. It is understood that aspects of method 140 can be combined with aspects of other methods described herein. In various embodiments, method 140 can comprise:

- receiving a commanded altitude $h_{cmd}$ for aircraft 10 (see block 142);
- computing an altitude error $h_{err}$ indicative of a difference between the altitude h of aircraft 10 and the commanded altitude $h_{cmd}$ (see block 144);
- computing a target rate of change $h_{des}$ for the altitude h of aircraft 10 using a sliding mode control technique, an input to the sliding mode control technique including the altitude error $h_{err}$ (see block 146);

computing a value indicative of a target change in thrust force for aircraft 10 using a FL control technique, an input to the FL control technique including the target rate of change $\dot{h}_{des}$ of the altitude h of aircraft 10; and using the value to control one or more actuators 34 of aircraft 10 during flight.

The value can be a target change in TLA of aircraft 10.

The FL control technique can include using an inversion of a relationship between the altitude h of aircraft 10 and an air speed of aircraft 10 to calculate the value.

The FL control technique can include determining rate of change $\hat{\dot{V}}_T$ of a true air speed $\hat{V}_T$ of the aircraft; and computing a target change in thrust force $\Delta T_c$ using the following formula:

$$\Delta T_c = \frac{m}{\hat{V}_T}\left(g\dot{h}_{des} + \hat{V}_T\hat{\dot{V}}_T\right),$$

where g denotes a value of a gravitational acceleration, and m denotes a mass of the aircraft.

The sliding mode control technique can include generating the target rate of change $\dot{h}_{des}$ of the altitude h, as a function of the altitude error $h_{err}$, a first threshold $C_{h,1}$, a second threshold $C_{h,2}$, and a third threshold $C_{h,3}$ such that the target rate of change $\dot{h}_{des}$ of the altitude h of aircraft 10, when the absolute value of the altitude error $h_{err}$ is greater than the first threshold $C_{h,1}$, is chosen to be substantially equal to an altitude saturation rate $\dot{h}_{lim}$.

When the absolute value of the altitude error $h_{err}$ is less than the first threshold $C_{h,1}$ and greater than the second threshold $C_{h,2}$, the target rate of change $\dot{h}_{des}$ of the altitude h can be computed using the following formula:

$$\dot{h}_{des} = \text{sign}(h_{err})\sqrt{2\left(\frac{\dot{h}_{lim}^2}{2C_{h,1} - C_{h,2}}\right)\left(|h_{err}| - \frac{C_{h,2}}{2}\right)},$$

where sign($h_{err}$) is a signum function of the altitude error $h_{err}$.

When the absolute value of the altitude error $h_{err}$ is less than the third threshold $C_{h,3}$, the target rate of change $\dot{h}_{des}$ of the altitude h can be chosen based on a proportional-integral-derivative control function of the altitude error $h_{err}$.

When the absolute value of the altitude error $h_{err}$ is less than the second threshold $C_{h,2}$ and greater than the third threshold $C_{h,3}$, the target rate of change $\dot{h}_{des}$ of the altitude h can be chosen to be proportional to the altitude error $h_{err}$.

When the absolute value of the altitude error $h_{err}$ is less than the second threshold $C_{h,2}$ and greater than the third threshold $C_{h,3}$, the target rate of change $\dot{h}_{des}$ of the altitude h can be computed using the following formula:

$$\dot{h}_{des} = \left(\sqrt{\frac{\dot{h}_{lim}^2}{C_{h,2}(2C_{h,1} - C_{h,2})}}\right)h_{err}.$$

When the absolute value of the altitude error $h_{err}$ is less than the third threshold $C_{h,3}$, a proportional term in the proportional-integral-derivative control function can be substantially equal to $$\left(\sqrt{\frac{\dot{h}_{lim}^2}{C_{h,2}(2C_{h,1} - C_{h,2})}}\right).$$

The above description is meant to be exemplary only, and one skilled in the relevant arts will recognize that changes can be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A method for controlling an altitude (h) of an aircraft during flight, the method comprising:

receiving a commanded altitude ($h_{cmd}$) for the aircraft;

computing an altitude error ($h_{err}$) indicative of a difference between the altitude (h) of the aircraft and the commanded altitude ($h_{cmd}$);

computing a target rate of change ($\dot{h}_{des}$) for the altitude (h) of the aircraft using a sliding mode control technique, an input to the sliding mode control technique including the altitude error ($h_{err}$);

computing a value indicative of a target change in thrust force for the aircraft using a feedback linearization (FL) control technique, an input to the FL control technique including the target rate of change ($\dot{h}_{des}$) of the altitude (h) of the aircraft; and using the value to control one or more actuators of the aircraft during flight.

2. The method of claim 1, wherein the value is a target change in thrust lever angle of the aircraft.

3. The method of claim 1, wherein the FL control technique includes using an inversion of a relationship between the altitude (h) of the aircraft and an air speed of the aircraft to calculate the value.

4. The method of claim 1, wherein the FL control technique includes:

determining rate of change ($\hat{\dot{V}}_T$) of a true air speed ($\hat{V}_T$) of the aircraft; and computing the target change in thrust force ($\Delta T_c$) using the following formula $$\Delta T_c = \frac{m}{\hat{V}_T}\left(g\dot{h}_{des} + \hat{V}_T\hat{\dot{V}}_T\right),$$

where g denotes a value of a gravitational acceleration, and m denotes a mass of the aircraft.

5. The method as defined in claim 1, wherein the sliding mode control technique includes generating the target rate of change ($\dot{h}_{des}$) of the altitude (h), as a function of the altitude error ($h_{err}$), a first threshold ($C_{h,1}$), a second threshold ($C_{h,2}$), and a third threshold ($C_{h,3}$) such that the target rate of change ($\dot{h}_{des}$) of the altitude (h) of the aircraft, when the absolute value of the altitude error ($h_{err}$) is greater than the first threshold ($C_{h,1}$), is chosen to be substantially equal to an altitude saturation rate ($\dot{h}_{lim}$).

6. The method of claim 5, wherein, when the absolute value of the altitude error ($h_{err}$) is less than the first threshold ($C_{h,1}$) and greater than the second threshold ($C_{h,2}$), the target rate of change ($\dot{h}_{des}$) of the altitude (h) is computed using the following formula:

$$\dot{h}_{des} = \text{sign}(h_{err})\sqrt{2\left(\frac{\dot{h}_{lim}^2}{2C_{h,1} - C_{h,2}}\right)\left(|h_{err}| - \frac{C_{h,2}}{2}\right)},$$

where sign ($h_{err}$) is a signum function of the altitude error ($h_{err}$).

7. The method of claim 5, wherein, when the absolute value of the altitude error ($h_{err}$) is less than the third threshold ($C_{h,3}$), the target rate of change ($\dot{h}_{des}$) of the altitude (h) is chosen based on a proportional-integral-derivative control function of the altitude error ($h_{err}$).

8. The method of claim 7, wherein, when the absolute value of the altitude error ($h_{err}$) is less than the third threshold $C_{h,3}$, a proportional term in the proportional-integral-derivative control function is substantially equal to $$\left(\sqrt{\frac{\dot{h}_{lim}^2}{C_{h,2}(2C_{h,1} - C_{h,2})}}\right)h_{err}.$$

9. The method of claim 5, wherein, when the absolute value of the altitude error ($h_{err}$) is less than the second threshold ($C_{h,2}$) and greater than the third threshold ($C_{h,3}$), the target rate of change ($\dot{h}_{des}$) of the altitude (h) is chosen to be proportional to the altitude error ($h_{err}$).

10. The method of claim 5, wherein, when the absolute value of the altitude error ($h_{err}$) is less than the second threshold ($C_{h,2}$) and greater than the third threshold ($C_{h,3}$), the target rate of change ($\dot{h}_{des}$) of the altitude (h) is computed using the following formula:

$$\dot{h}_{des} = \left(\sqrt{\frac{\dot{h}_{lim}^2}{C_{h,2}(2C_{h,1} - C_{h,2})}}\right)h_{err}.$$

11. The method of claim 1, wherein the sliding mode control technique includes using a sigmoid function as a mapping between the target rate of change ($\dot{h}_{des}$) of the altitude (h) and the altitude error ($h_{err}$).

12. The method as defined in claim 1, wherein the aircraft is a blended wing body aircraft.

13. A computer program product for implementing an altitude control function of an aircraft during flight, the computer program product comprising a non-transitory machine-readable storage medium having program code embodied therewith, the program code readable/executable by a computer, processor or logic circuit to perform a method as defined in claim 1.

14. A system for controlling an altitude (h) of an aircraft during flight, the system comprising:

one or more computers operatively coupled to receive one or more signals indicative of a commanded altitude ($h_{cmd}$) for the aircraft, the one or more computers being configured to:

compute an altitude error ($h_{err}$) indicative of a difference between the altitude (h) of the aircraft and the commanded altitude ($h_{cmd}$);

compute a target rate of change ($\dot{h}_{des}$) for the altitude (h) of the aircraft using a sliding mode control technique, an input to the sliding mode control technique including the altitude error ($h_{err}$);

compute a value indicative of a target change in thrust force for the aircraft using a feedback linearization control technique, an input to the FL control technique including the target rate of change ($\dot{h}_{des}$) of the altitude (h) of the aircraft; and using the value to control one or more actuators of the aircraft during flight.

15. The system of claim 14, wherein the value is a target change in thrust lever angle of the aircraft.

16. The system of claim 14, wherein the FL control technique includes using an inversion of a relationship between the altitude (h) of the aircraft and an air speed of the aircraft to calculate the value.

17. The system of claim 14, wherein the FL control technique includes:

determining rate of change ($\dot{\hat{V}}_T$) of a true air speed ($\hat{V}_T$) of the aircraft; and computing the target change in thrust lever angle ($\Delta T_c$) using the following formula:

$$\Delta T_c = \frac{m}{\hat{V}_T}\left(g\dot{h}_{des} + \dot{\hat{V}}_T\hat{V}_T\right),$$

where g denotes a value of a gravitational acceleration, and m denotes a mass of the aircraft.

18. The system as defined in claim 14, wherein the sliding mode control technique includes generating the target rate of change ($\dot{h}_{des}$) of the altitude (h), as a function of the altitude error ($h_{err}$), a first threshold ($C_{h,1}$), a second threshold ($C_{h,2}$), and a third threshold ($C_{h,3}$) such that the target rate of change ($\dot{h}_{des}$) of the altitude (h) of the aircraft, when the absolute value of the altitude error ($h_{err}$) is greater than the first threshold ($C_{h,1}$), is chosen to be substantially equal to an altitude saturation rate ($\dot{h}_{lim}$).

19. The system of claim 18, wherein, when the absolute value of the altitude error ($h_{err}$) is less than the first threshold ($C_{h,1}$) and greater than the second threshold ($C_{h,2}$), the target rate of change ($\dot{h}_{des}$) of the altitude (h) is computed using the following formula:

$$\dot{h}_{des} = \text{sign}(h_{err})\sqrt{2\left(\frac{\dot{h}_{lim}^2}{2C_{h,1} - C_{h,2}}\right)\left(|h_{err}| - \frac{C_{h,2}}{2}\right)},$$

where sign ($h_{err}$) is a signum function of the altitude error (herr).

20. The system of claim 18, wherein, when the absolute value of the altitude error ($h_{err}$) is less than the third threshold ($C_{h,3}$), the target rate of change ($\dot{h}_{des}$) of the altitude (h) is chosen based on a proportional-integral-derivative control function of the altitude error ($h_{err}$).

21. The system of claim 20, wherein, when the absolute value of the altitude error ($h_{err}$) is less than the third threshold $C_{h,3}$, a proportional term in the proportional-integral-derivative control function is substantially equal to $$\left(\sqrt{\frac{\dot{h}_{lim}^2}{C_{h,2}(2C_{h,1}-C_{h,2})}}\right)h_{err}.$$

22. The system of claim 18, wherein, when the absolute value of the altitude error ($h_{err}$) is less than the second threshold ($C_{h,2}$) and greater than the third threshold ($C_{h,3}$), the target rate of change ($\dot{h}_{des}$) of the altitude (h) is chosen to be proportional to the altitude error ($h_{err}$).

23. The system of claim 18, wherein, when the absolute value of the altitude error ($h_{err}$) is less than the second threshold ($C_{h,2}$) and greater than the third threshold ($C_{h,3}$), the target rate of change ($\dot{h}_{des}$) of the altitude (h) is computed using the following formula:

$$\dot{h}_{des}=\left(\sqrt{\frac{\dot{h}_{lim}^2}{C_{h,2}(2C_{h,1}-C_{h,2})}}\right)h_{err}.$$

24. The system of claim 14, wherein the sliding mode control technique includes using a sigmoid function as a mapping between the target rate of change ($\dot{h}_{des}$) of the altitude (h) and the altitude error ($h_{err}$).

* * * * *